US012679724B2

(12) United States Patent
Shi et al.

(10) Patent No.: US 12,679,724 B2
(45) Date of Patent: Jul. 14, 2026

(54) MATERIAL COMPOSITION FOR USE IN HYDROGEN STORAGE STRUCTURE, MATERIAL FOR USE IN HYDROGEN STORAGE STRUCTURE, AND HYDROGEN STORAGE SINGLE TUBE

(71) Applicant: Shanghai Jieneng Technology Co. Ltd., Shanghai (CN)

(72) Inventors: Jinhu Shi, Shanghai (CN); Yan Xu, Shanghai (CN)

(73) Assignee: SHANGHAI JIENENG TECHNOLOGY CO. LTD., Shanghai (CN)

( * ) Notice: Subject to any disclaimer, the term of this patent is extended or adjusted under 35 U.S.C. 154(b) by 734 days.

(21) Appl. No.: 18/023,688

(22) PCT Filed: Nov. 10, 2020

(86) PCT No.: PCT/CN2020/127683
§ 371 (c)(1),
(2) Date: Feb. 27, 2023

(87) PCT Pub. No.: WO2022/041488
PCT Pub. Date: Mar. 3, 2022

(65) Prior Publication Data
US 2024/0017991 A1    Jan. 18, 2024

(30) Foreign Application Priority Data
Aug. 28, 2020    (CN) .......................... 202010884669.7

(51) Int. Cl.
C01B 3/0078    (2026.01)
C01B 3/0084    (2026.01)
(52) U.S. Cl.
CPC .......... *C01B 3/0078* (2013.01); *C01B 3/0084* (2013.01)

(58) Field of Classification Search
CPC ................................................... C01B 3/0078
See application file for complete search history.

(56) References Cited

U.S. PATENT DOCUMENTS

| | | | |
|---|---|---|---|
| 6,855,749 B1 | 2/2005 | Yadav et al. | |
| 2004/0253514 A1* | 12/2004 | Aoki ..................... | C01B 3/0047 |
| | | | 429/218.2 |

(Continued)

FOREIGN PATENT DOCUMENTS

| | | |
|---|---|---|
| CN | 1350979 | 5/2002 |
| CN | 1948818 | 4/2007 |

(Continued)

*Primary Examiner* — William D Young
(74) *Attorney, Agent, or Firm* — MORRISON & FOERSTER LLP

(57) ABSTRACT

Provided is a material for use in a hydrogen storage structure, a hydrogen storage single tube, and a material composition for a hydrogen storage structure used for the preparation of the material for use in the hydrogen storage structure and the hydrogen storage single tube. The hydrogen storage single tube is provided with a honeycomb-shaped high pressure hydrogen storage structure with a micron-sized pore diameter and is lightweight. A hydrogen storage structure having a pore diameter of 150 μm and a pipe wall thickness of 35 μm has an ultimate pressure of >200 MPa, a Rockwell hardness of 86-89, a high temperature resistance of >1900° C., a low temperature resistance of <−260° C., low thermal conductivity, high temperature thermal insulation, and strong acid and alkali resistance. In a high density hydrogen work atmosphere and a complicated dynamic environment, the high pressure hydrogen storage structure is very stable.

14 Claims, 1 Drawing Sheet

(56) References Cited

U.S. PATENT DOCUMENTS

| | | | |
|---|---|---|---|
| 2006/0097221 A1* | 5/2006 | Torgersen | C01B 3/0031 |
| | | | 252/184 |
| 2010/0255978 A1 | 10/2010 | Rosenflanz et al. | |
| 2012/0171412 A1 | 7/2012 | Raffy et al. | |
| 2012/0276325 A1 | 11/2012 | Raffy et al. | |
| 2014/0178291 A1 | 6/2014 | Bennington et al. | |
| 2017/0335999 A1 | 11/2017 | Ochiai et al. | |
| 2020/0203028 A1 | 6/2020 | Pegna et al. | |
| 2020/0247971 A1 | 8/2020 | Cavalli et al. | |

FOREIGN PATENT DOCUMENTS

| | | |
|---|---|---|
| CN | 106396683 | 2/2017 |
| CN | 110804705 | 2/2020 |
| CN | 110953477 | 4/2020 |
| CN | 111303511 | 6/2020 |
| CN | 211146067 | 7/2020 |
| DE | 19954225 | 5/2001 |
| JP | 2014031299 | 2/2014 |

* cited by examiner

MATERIAL COMPOSITION FOR USE IN HYDROGEN STORAGE STRUCTURE, MATERIAL FOR USE IN HYDROGEN STORAGE STRUCTURE, AND HYDROGEN STORAGE SINGLE TUBE

CROSS REFERENCE TO RELATED APPLICATIONS

This application is a national stage application under 35 U.S.C. § 371 of International Patent Application No. PCT/CN2020/127683, filed internationally on Nov. 10, 2020, which claims priority to Chinese Patent Application No. 202010884669.7, filed Aug. 28, 2020, which applications are incorporated herein by reference in their entities for all purposes.

TECHNICAL FIELD

The present invention relates to the technical field of hydrogen storage and in particular to a material for hydrogen storage structure and an individual hydrogen storage tube.

BACKGROUND ART

The year of 2019 marks the initial development of a complete industry chain for hydrogen energy generation in China. Hydrogen is a clean alternative energy source, and as a key for the utilization thereof, the technology for hydrogen storage has direct influences on safety, as well as on the macroscopic social benefit and efficiency of hydrogen storage, mobile transport and mobile applications. Therefore, the technology for high pressure hydrogen storage at 70 MPa-110 MPa with high safety and stability has attracted more and more attention.

Most of the current 35 MPa and 70 MPa mobile hydrogen storage containers in China adopt the worldwide customary hollow inner tank in combination with the high-quality carbon fiber of type M40 or T1000 from Toray, Japan, which achieves the advantage of lightweight but may cause extensive safety problems. In order to realize a high pressure strength, high safety and high stability at a large massive specific density, a technical breakthrough is needed in terms of the high pressure hydrogen storage structure with micrometer-scale pores and the lightweight material resistant to high pressure, which is however extremely difficult.

High safety and stability in hydrogen storage are the most important criteria for the evaluation of the healthy development of hydrogen energy industry. For the outer pressure strength achieved by a thick coating of carbon fibers over a currently predominant container, an unpredictable high risk exists during its service life with regards to its application, and it is often necessary to perform regular safety inspection during its service life. There is however still a potential high risk, because the dynamic energy of hydrogen under high pressure and the stress causes the pressure-resistant layer of the container to be broken and aged.

Domestically, the hydrogen storage at 35 MPa, which leads to an insufficient endurance, are usually connected in parallel in a confined accommodation space, thus multiplying the safety risk. Even the container at 70 MPa has a huge and cumbersome cylindric outer form and occupies a considerable amount of volume.

A hollow inner tank at 35 MPa-70 MPa cannot avoid the generation of a critical high pressure at a high temperature under dynamic conditions. An automatic release is required for the container at a high pressure to reach a safe pressure value, which however also causes a heavy loss of hydrogen.

Moreover, the rapid development and popularization of hydrogen energy would be impacted by the high application costs of imported carbon fibers, if the current and future development of technologies for hydrogen storage containers relies thereon. This may in turn be adverse to economic and social benefits and lead to a bottleneck due to the worrisome scarcity in supply chain.

Therefore, a new technology for high pressure hydrogen storage with high pressure strength, safety and stability, which can solve the above-mentioned extensive problems in the field of mobile high pressure hydrogen storage using a hollow inner tank, is urgently required.

SUMMARY OF THE INVENTION

In particular, the present invention provides a material composition for a hydrogen storage structure. The raw materials for the material composition for a hydrogen storage structure comprise the following components:

20-24 parts by weight of polyimide, 12-13 parts by weight of polyvinyl acetate, 15-17 parts by weight of aluminum chloride, 3-5 parts by weight of magnesium chloride, 3-5 parts by weight of barium chloride, 10-12 parts by weight of aluminum oxide, 15-17 parts by weight of zirconium dioxide, 0.5-0.7 parts by weight of lanthanum oxide, cerium oxide and/or lanthanum cerium oxide, 32-35 parts by weight of silicon dioxide, silicon carbide and/or beryllium oxide, 1.5-2.5 parts by weight of sodium hydroxide and/or potassium hydroxide, 1.5-3 parts by weight of yttrium oxide, 6-8 parts by weight of titanium dioxide and/or titanium carbide, 0.3-0.5 parts by weight of hafnium dioxide and/or hafnium carbide, optionally 0.3-0.5 parts by weight of calcium chloride, and optionally at most 10 parts by weight of zinc carbide.

In one or more embodiments, the raw materials for the material composition for a hydrogen storage structure further comprise water and a polar solvent.

In one or more embodiments, the polar solvent is selected from dimethyl acetamide, dimethyl formamide and N-methyl pyrrolidone.

In one or more embodiments, the material composition for a hydrogen storage structure has a viscosity of 90000±10000 cP.

The present invention further provides a method for preparing the material composition for a hydrogen storage structure according to any embodiment of the invention. The method comprises the steps of:

(1) mixing aluminum chloride and magnesium chloride, dissolving same by adding water, adding sodium hydroxide and/or potassium hydroxide, and obtaining a white precipitate after reaction; adding barium chloride and optionally calcium chloride to the white precipitate, and stirring thoroughly, drying, thermal treating at a high temperature of 700-900° C., and crushing same, to obtain a composition A;

(2) mixing aluminum oxide, zirconium dioxide, yttrium oxide, titanium dioxide and/or titanium carbide, hafnium dioxide and/or hafnium carbide, and optionally zinc carbide, to obtain a composition B;

(3) adding silicon dioxide, silicon carbide and/or beryllium oxide to a polyimide solution, stirring thoroughly, adding the composition B, stirring thoroughly, adding lanthanum oxide, cerium oxide and/or lanthanum cerium oxide, and stirring thoroughly, to obtain a composition C;

(4) adding the composition A to a polyvinyl acetate solution, stirring thoroughly, mixing the resultant mixture and the composition C, and stirring thoroughly, and finally obtaining the material composition for a hydrogen storage structure.

In one or more embodiments, the method possesses one or more of the following features:

(1) in step (1), the mixed solution of aluminum chloride and magnesium chloride obtained by adding water has a concentration of 40-60 wt %;

(2) in step (1), the duration of the thermal treatment at a high temperature is 80-100 min;

(3) in step (1), the crushed composition A has a mesh number of 8000 or more;

(4) in step (3), the polyimide solution is a solution obtained by dissolving a polyimide in a polar solvent which is selected from dimethyl acetamide, dimethyl formamide and N-methyl pyrrolidone, and the polyimide solution has a viscosity of 90000 cP±2000 cP;

(5) step (3) is carried out at 35-45° C. and under a vacuum of −94 kPa to −101 kPa;

(6) in step (4), the polyvinyl acetate solution is an aqueous solution of polyvinyl acetate with a concentration of 70-80 wt %;

(7) in step (4), the mixture of the polyvinyl acetate solution and the composition A is mixed with the composition C at 35-45° C. and under a vacuum of −94 kPa to −101 kPa;

(8) in step (4), a polar solvent selected from dimethyl acetamide, dimethyl formamide and N-methyl pyrrolidone is added after the mixture of the polyvinyl acetate solution and the composition A is mixed with the composition C, so as to adjust the viscosity of the mixture to 90000±10000 cP.

The present invention further provides a material for hydrogen storage structure. Based on the total mass of the material for a hydrogen storage structure, the material for a hydrogen storage structure comprises the following components: 33-39 wt % of silicon dioxide and/or beryllium oxide, 17-22 wt % of aluminum oxide, 20-28 wt % of zirconium dioxide, 6-10 wt % of titanium dioxide, 0.25-0.5 wt % of hafnium oxide, 0.45-0.9 wt % of lanthanum oxide, cerium oxide and/or lanthanum cerium oxide, 1-2.7 wt % of yttrium oxide, 0.12-1 wt % of potassium oxide and/or sodium oxide, 0.18-0.4 wt % of magnesium oxide, 1-1.7 wt % of barium oxide, 0-10 wt % of zinc oxide, optionally 0.07-0.7 wt % of calcium oxide, and unavoidable impurities.

The present invention further provides a composite material for a hydrogen storage structure which comprises the material for a hydrogen storage structure according to any embodiment of the invention and a reinforcement filler.

The present invention further provides a method for preparing the material or the composite material for a hydrogen storage structure described here. The method comprises the steps of: curing the material composition for a hydrogen storage structure according to any embodiment of the invention or a mixture of the material composition for a hydrogen storage structure and a reinforcement filler at 40-45° C. for 200-250 min, heating at 50-60° C. for 50-70 min, heating at 360-480° C. for 50-70 min, sintering at 850-900° C. for 80-100 min, and then sintering at 1400-1450° C. for 250-350 min or sintering at 3000° C.±100° C.

The present invention further provides an individual hydrogen storage tube comprising a hydrogen storage unit, which is made by the material for a hydrogen storage structure according to any embodiment herein and has a honeycomb-like microporous structure, preferably the micropore has a wall thickness of 35-40 μm; and preferably the micropore has a diameter of 140-150 μm.

In one or more embodiments, the individual hydrogen storage tube also comprises a housing which is made by the material or the composite material for a hydrogen storage structure according to any embodiment of the invention.

The present invention further provides a method for preparing the individual hydrogen storage tube described here. The method comprises the steps of:

(1) impregnating a polymer fiber bundle with the material composition for a hydrogen storage structure according to any embodiment of the invention;

(2) curing the polymer fiber bundle impregnated with the material composition for a hydrogen storage structure at 40-45° C. for 200-250 min, heating at 50-60° C. for 50-70 min, heating at 360-480° C. for 50-70 min, sintering at 850-900° C. for 80-100 min, and then sintering at 1400-1450° C. for 250-350 min or sintering at 3000° C.±100° C.; or alternatively, filling the polymer fiber bundle impregnated with the material composition for a hydrogen storage structure into a tubular mold, curing at 40-45° C. for 200-250 min, heating at 50-60° C. for 50-70 min, heating at 360-480° C. for 50-70 min, sintering at 850-900° C. for 80-100 min, and then sintering at 1400-1450° C. for 250-350 min or sintering at 3000° C.±100° C.

In one or more embodiments, the viscosity of the material composition for a hydrogen storage structure is firstly adjusted to 200000±10000 cP before the impregnation in step (1).

In one or more embodiments, the polymer fiber has a melting point between 150° C. and 380° C.

In one or more embodiments, a single fiber in the polymer fiber bundle has a diameter of 100-150 μm.

In one or more embodiments, the average thickness of the material composition for a hydrogen storage structure coated on the surfaces of the fibers in the polymer fiber bundle by impregnation in step (1) is preferably 25-30 μm.

The present invention further provides the use of the material composition for a hydrogen storage structure, the material for a hydrogen storage structure, the composite material for a hydrogen storage structure, the hydrogen storage structure, or the individual hydrogen storage tube described herein in high pressure hydrogen storage and/or storage of liquefied hydrogen.

DETAILED DESCRIPTION OF EMBODIMENTS

Figure 1:
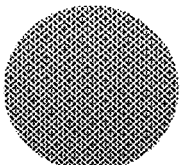
FIG. 1 is a schematic view of a honeycomb-like hydrogen storage structure of micrometer scale inside an individual tube of the invention.

In order to make the features and effects of the present invention understandable to a person skilled in the art, the terms and words mentioned in the description and claims will be generally described and defined hereafter. Unless otherwise stated, all the technical and scientific words used herein possess the general meaning as known by a person skilled in the art for the present invention. The definition in the present invention is preferential, if a conflict exists.

The theories and mechanisms described and disclosed herein, regardless of their correctness, should not limit the scope of the present invention in any way, that is, the present invention can be embodied without being limited to any specific theory and mechanism.

All features which are defined herein by value ranges or percentage ranges, such as quantity, content and concentration, are only for the sake of briefness and convenience. Thus, the description of a value range or a percentage range should be considered as covering and particularly disclosing all possible sub-ranges and individual values in the range (including integral numbers and fractions).

Unless particularly stated, a proportion herein refers to mass proportion and a percentage refers to a mass percentage.

For the sake of briefness, not all the possible combinations of the technical features in the embodiments or examples are described herein. Therefore, the technical features of the embodiments and examples can be combined as desire, as long as there is no contradiction in the combination of technical features, and all possible combinations should be considered as being covered by the scope of the description.

Safe high pressure storage of hydrogen is a key section in the development and popularization of hydrogen energy. For worldwide customary high pressure hydrogen storage container, a hollow inner tank coated with multiple layers of a high quality composite material made of carbon fiber/epoxy resin (carbon fiber-reinforced plastic, CFRP) is often used, which achieves a high pressure strength by means of the surface pressure strength and has the advantage in terms of mass and specific density. It is also widely applied in China. However, under complex dynamic conditions, there is a high potential risk of breaking and leaking due to the high dynamic pressure of hydrogen together with temperature rising and inner stress, which could not be addressed by thickening the carbon fiber layer. In China, there has been several instances of injury accidents resulting from the explosion of leaked natural gas at 70 MPa applied in mobile vehicles. Moreover, the use of a large amount of imported carbon fibers leads to high costs and the dependence on limited sources, which in turn results in problems regarding sustainable development and economic practicability. In order to solve the problem with the safety and stability of high pressure hydrogen storage containers of hollow inner tank type, a new composite material for a high pressure hydrogen storage structure and a high pressure hydrogen storage structure are purposed in the present invention. The basic ideas of design in the present invention includes: 1. the development of a high performance material with a low massive specific weight, to replace imported carbon fibers; 2. the development of a micrometer-scale microporous honeycomb-like structure, to replace the hollow inner tank. In the present invention, the large volume of hydrogen is separately stored in hair-thin partitions, which can very effectively limit the activation energy of high pressure hydrogen. The clustering microporous honeycomb-like structure can thoroughly eliminate the problem of high safety risk with the hydrogen storage in a hollow inner tank at high pressure and achieve a safe pressure strength up to 70 MPa-110 MPa and a multiplied safety factor. In addition, the cumbersome and huge coating over the hollow inner tank can be omitted, thus increasing the efficiency of hydrogen storage, significantly reducing the size and effectively raising the economic benefit for hydrogen storage.

The present invention provides a composite material composition usable for preparing a hydrogen storage structure, also referred to as a material composition for a hydrogen storage structure, which is a solid-liquid mixture with a certain viscosity at normal temperature. The material for a hydrogen storage structure according to the present invention is made by the material composition for a hydrogen storage structure according to the present invention through curing and sintering. The hydrogen storage structure according to the present invention is made by impregnating polymer fibers with the composite material composition according to the present invention, followed by curing and sintering. The hydrogen storage structure according to the present invention is suitable for high pressure hydrogen storage and is thus also referred to as high pressure hydrogen storage structure.

The composite material composition according to the present invention comprises polyimide (PI). The composite material according to the present invention has the structure of an inorganic metallographical phase. Therefore, the composite material, the composite material composition, and the high pressure hydrogen storage structure according to the present invention are herein referred to respectively as PMTS (organic polymer PI+inorganic metallographical structure) material, PMTS material composition, and high pressure hydrogen storage structure of PMTS material for short. The composite material according to the present invention is a suitable material for hydrogen storage structure and is thus also referred to as material for a hydrogen storage structure.

The PMTS material composition according to the present invention comprises: 10-40 parts by weight of polyimide, 8-18 parts by weight of polyvinyl acetate, 15-40 parts by weight of metal chlorides, 10-70 parts by weight of metal oxides and/or metal carbides, 10-40 parts by weight of silicon dioxide and/or silicon carbide, 0.5-5 parts by weight of rare earth metal oxides, and 1-5 parts by weight of alkali metal hydroxides. In some embodiments, the raw materials for the PMTS material composition also comprise an appropriate amount of water and a polar solvent. In some embodiments, as raw materials for the PMTS material composition, the metal chlorides comprise one or more selected from aluminum chloride, magnesium chloride, barium chloride and calcium chloride. Preferably, the metal chlorides comprise aluminum chloride, magnesium chloride, barium chloride, and optionally also calcium chloride. In the raw materials for the PMTS material composition, if present, the amount of aluminum chloride is preferably 10-20 parts by weight, the amount of magnesium chloride is preferably 1-10 parts by weight, the amount of barium chloride is preferably 1-10 parts by weight, and the amount of calcium chloride is preferably 0.1-1 parts by weight. The metal oxides herein do not include rare earth metal oxides. In some embodiments, as raw materials for the PMTS material composition, the metal oxides comprise one or more selected from aluminum oxide, zirconium oxide, titanium oxide, hafnium oxide and beryllium oxide. In the raw materials for the PMTS material composition, if present, the amount of aluminum oxide is preferably 5-15 parts by weight, the amount of zirconium oxide is preferably 10-20 parts by weight, the amount of titanium oxide is preferably 5-10 parts by weight, the amount of hafnium oxide is preferably 0.1-1 parts by weight, and the amount of beryllium oxide is preferably 30-40 parts by weight. In some embodiments, as raw materials for the PMTS material composition, the metal carbides comprise one or more selected from silicon carbide, titanium carbide, hafnium carbide and zinc carbide. In the raw materials for the PMTS material composition, if present, the amount of silicon carbide is preferably 10-40 parts by weight, the amount of titanium carbide is preferably 5-10 parts by weight, and the amount of hafnium carbide is preferably 0.1-1 parts by weight. In some embodiments, as raw materials for the PMTS material composition, the rare earth metal oxides comprise one or more selected from lanthanum oxide, cerium oxide, lanthanum cerium oxide and yttrium oxide, preferably yttrium oxide and one or more selected from lanthanum oxide, cerium oxide and lanthanum cerium oxide. In the raw materials for the PMTS material composition, if present, the total amount of lanthanum oxide, cerium oxide, and lanthanum cerium oxide is preferably 0.2-1 parts by weight, and the amount of yttrium oxide is preferably 1-5 parts by weight. In some embodiments, as raw materials for the PMTS material composition, the alkali metal hydroxides comprise either or both of sodium hydroxide and potassium hydroxide.

In a preferable embodiment, the PMTS material composition comprises the following components: 20-24 parts by weight of polyimide (PI), 12-13 parts by weight of polyvinyl acetate (PVAc), 15-17 parts by weight of aluminum chloride ($AlCl_3$), 3-5 parts by weight of magnesium chloride ($MgCl_2$), 3-5 parts by weight of barium chloride ($BaCl_2$), 10-12 parts by weight of aluminum oxide ($Al_2O_3$), 15-17 parts by weight of zirconium dioxide ($ZrO_2$), 0.5-0.7 parts by weight of lanthanum oxide ($La_2O_3$), cerium oxide and/or lanthanum cerium oxide, 32-35 parts by weight of silicon dioxide ($SiO_2$), silicon carbide and/or beryllium oxide, 1.5-2.5 parts by weight of sodium hydroxide (NaOH) and/or potassium hydroxide (KOH), 1.5-3 parts by weight of yttrium oxide ($Y_2O_3$), 6-8 parts by weight of titanium dioxide ($TiO_2$) and/or titanium carbide, 0.3-0.5 parts by weight of hafnium dioxide ($HfO_2$) and/or hafnium carbide, optionally 0.3-0.5 parts by weight of calcium chloride ($CaCl_2$) and optionally at most 10 parts by weight of zinc carbide. In some embodiments, the 32-35 parts by weight of silicon dioxide, silicon carbide and/or beryllium oxide is composed of: 32-35 parts by weight of silicon dioxide and/or silicon carbide; or 32-35 parts by weight of silicon dioxide and/or silicon carbide and beryllium oxide, wherein the amount of beryllium oxide is preferably 5-15 parts by weight. In some embodiments, the raw materials for the PMTS material composition comprise the following components: 20-24 parts by weight of PI, 12-13 parts by weight of polyvinyl acetate, 15-17 parts by weight of aluminum chloride, 3-5 parts by weight of magnesium chloride, 3-5 parts by weight of barium chloride, 10-12 parts by weight of aluminum oxide, 15-17 parts by weight of zirconium dioxide, 0.5-0.7 parts by weight of lanthanum oxide, cerium oxide and/or lanthanum cerium oxide, 32-35 parts by weight of silicon dioxide and/or beryllium oxide, 1.5-2.5 parts by weight of sodium hydroxide and/or potassium hydroxide, 1.5-3 parts by weight of yttrium oxide, 6-8 parts by weight of titanium dioxide ($TiO_2$), 0.3-0.5 parts by weight of hafnium dioxide ($HfO_2$), and optionally 0.3-0.5 parts by weight of calcium chloride ($CaCl_2$). In some embodiments, the 32-35 parts by weight of silicon dioxide and/or beryllium oxide is composed of: 32-35 parts by weight of silicon dioxide; or 32-35 parts by weight of silicon dioxide and beryllium oxide, wherein the amount of beryllium oxide is preferably 5-15 parts by weight. In the invention, the optionally 5-15 parts by weight of beryllium oxide replaces a part of silicon dioxide or silicon carbide to achieve a better massive specific weight and hardness.

The raw materials for the PMTS material composition also comprise an appropriate amount of water and a polar solvent. With respect to 12-13 parts by weight of PVAc, the raw materials for the PMTS material composition comprise preferably 3-5.5 parts by weight of water, more preferably 3.5-5 parts by weight of water. In some embodiments, the raw materials for the PMTS material composition comprise or consist of the following components: PI, PVAc, aluminum chloride, magnesium chloride, barium chloride, aluminum oxide, zirconium dioxide, lanthanum oxide and/or cerium oxide and/or lanthanum cerium oxide, silicon dioxide and/or silicon carbide and/or beryllium oxide, sodium hydroxide and/or potassium hydroxide, yttrium oxide, titanium dioxide and/or titanium carbide, hafnium dioxide and/or hafnium carbide, water, optionally calcium chloride and optionally zinc carbide in the above-mentioned parts by weight, and an appropriate amount of a polar solvent. In the present invention, the amount of the polar solvent as a raw material for the PMTS material composition is preferably such that the viscosity of the PMTS material composition reaches 90000±10000 cP.

In the present invention, the water is preferably distilled water or deionized water. In the present invention, the polar solvent is preferably one or more selected from dimethyl acetamide (DMAc), dimethyl formamide (DMF) and N-methyl pyrrolidone (NMP).

In the present invention, the expression of parts by weight indicates the ratio of the parts by weight of the raw materials/materials, and it is understandable that the sum of parts by weight of the raw materials does not have to be 100 parts by weight.

In the present invention, the raw materials of metal oxides and metal carbides other than zirconium dioxide, hafnium oxide, hafnium carbide, lanthanum oxide, cerium oxide and lanthanum cerium oxide are preferably nanometer-scale ultra fine powders with a fineness of preferably in the order of magnitude of ten thousands and their average particle size is preferably 300 nm-2 μm. In order to guarantee the high quality of the PMTS material and to avoid the oxidation and crushing of harmful impurities during the high temperature sintering, it is preferable in the present invention to use raw materials with high purity, such as those with 4 N, 5 N or 6 N grade purity. The raw materials used in the present invention are either commercially available, or can be prepared through ultra fine processing by means of for example crushing and suspending fine powder with a high pressure gas flow.

The PMTS material composition can be prepared by a method comprising the following steps:
(1) mixing aluminum chloride and magnesium chloride, dissolving by adding an appropriate amount of water, adding sodium hydroxide and/or potassium hydroxide, and obtaining a white precipitate after reaction; adding barium chloride and optionally calcium chloride to the white precipitate, and stirring, drying, thermal treating at a high temperature of 700-900° C., and crushing same, to obtain a composition A;
(2) mixing aluminum oxide, zirconium dioxide, yttrium oxide, titanium dioxide and/or titanium carbide, hafnium dioxide and/or hafnium carbide, and optionally zinc carbide, to obtain a composition B;
(3) adding silicon dioxide, silicon carbide and/or beryllium oxide to a PI solution, stirring, adding the composition B, stirring, adding lanthanum oxide, cerium oxide and/or lanthanum cerium oxide, and stirring, to obtain a composition C; and (4) adding the composition A to a PVAc solution, stirring, mixing the resultant mixture and the composition C, and stirring same, and finally, the PMTS material composition is obtained.

It is understandable that the numbers for the above-mentioned steps are only used to distinguish the steps from each other, without limiting the order for performing these steps. A step can be performed as long as the raw materials/materials for that step are ready. For example, the steps of (2) and (3) may be performed before step (1), which is followed by step (4) finally.

In the present invention, aluminum chloride is preferably analytically pure anhydrous aluminum chloride, and magnesium chloride, sodium hydroxide and potassium hydroxide are preferably analytically pure. In step (1), the amount of aluminum chloride is 15-17 parts by weight, and the amount of magnesium chloride is 3-5 parts by weight. In step (1), the amount of water is preferably such that the concentration of the solution obtained by dissolving aluminum chloride and magnesium chloride is 40 wt %-60 wt %, for example, 40 wt %-50 wt %. In step (1), the total amount of sodium hydroxide and/or potassium hydroxide is 1.5-2.5 parts by weight. Generally, the respective amounts of sodium hydroxide and potassium hydroxide are not particularly limited, e. g. it is possible to use sodium hydroxide or potassium hydroxide alone. In step (1), sodium hydroxide and/or potassium hydroxide are/is preferably added stepwise. In a preferable embodiment, in step (1), 1.2-2 parts by weight of sodium hydroxide and 0.3-0.5 parts by weight of potassium hydroxide are added. After the addition of sodium hydroxide and/or potassium hydroxide, an exothermic reaction takes place. It is preferable to allow the reaction to continue until the mixture is cooled down and a white precipitate is generated. Barium chloride and optionally calcium chloride are added to the white precipitate. In step (1), the amount of barium chloride is 3-5 parts by weight. Calcium chloride is optional and if it is used, the amount of calcium chloride is 0.3-0.5 parts by weight. In some embodiments, in step (1), barium chloride and optionally calcium chloride are added and stirred, allowed to stand still, and then dried. The duration for still standing is preferably 30 min or more. In step (1), the drying temperature is preferably 90-110° C. In step (1), the temperature for high temperature treatment is preferably 700-900° C. and the duration is preferably 80-100 min. In some embodiments, in step (1), the mixture is cooled after the high temperature treatment, and crushed to a mesh number of 8000 or more in a ball mill, so as to obtain the composition A.

In the present invention, the aluminum oxide is nanometer-scale aluminum oxide; the zirconium dioxide is ultra fine zirconium dioxide, preferably micrometer-scale zirconium dioxide (e. g. with a particle size of 1-5 μm); the yttrium oxide is nanometer-scale aluminum oxide; the titanium dioxide is nanometer-scale titanium dioxide, preferably of rutile type; the hafnium dioxide is ultra fine hafnium dioxide (e. g. with a particle size of 800 nm-2 μm); the hafnium carbide is ultra fine hafnium carbide (e. g. with a particle size of 800 nm-2 μm); the titanium carbide is nano titanium carbide; and the zinc carbide is nano zinc carbide. In step (2), the amount of aluminum oxide is 10-12 parts by weight, the amount of zirconium dioxide is 15-17 parts by weight, the amount of yttrium oxide is 1.5-3 parts by weight, the total amount of titanium dioxide and titanium carbide is 6-8 parts by weight, the total amount of hafnium chloride and hafnium carbide is 0.3-0.5 parts by weight, and the amount of zinc carbide, if it is used, is not more than 10 parts by weight.

The PI suitable for application in the present invention is preferably PI of electrical engineering grade or better and can be either thermosetting PI, for example SP-1 from DuPont, U.S.A, or thermoplastic PI, for example JNF3020 from Mitsui Chemicals Inc., Japan. The characteristic viscosity of the PI suitable for the present invention is preferably 0.52-0.81 dL/g. In the present invention, the PI solution is obtained by diluting PI with a polar solvent. In step (3), the amount of PI is 20-24 parts by weight, i. e. the PI contained in the PI solution used is 20-24 parts by weight. In step (3), the PI solution used has a viscosity of 90000 cP±2000 cP. In the present invention, the viscosity indicates the viscosity measured at a normal temperature and a normal pressure (25° C., one ATM). The method for preparing the PI solution used in step (3) is not particularly limited, for example, a solid PI raw material can be used, which is dissolved in an appropriate amount of a polar solvent to produce a PI solution with a viscosity of 90000 cP±2000 cP. It is also possible to dilute a PI solution, which was dissolved in a polar solvent beforehand and has a higher viscosity (for example, a PI solution with a concentration of 28-32 wt %), as a raw material with a polar solvent to produce a PI solution with a viscosity of 90000 cP±2000 cP. In some embodiments, the polar solvent is added to the solid PI or the PI solution with a concentration of 28-32 wt % at 35-45° C. and under a vacuum of –94 kPa to –101 kPa and stirred to produce a PI solution with a viscosity of 90000 cP±2000 cP. The rotation speed for stirring is preferably 8-12 r/min and the duration for stirring is preferably 15-25 min. In step (3), the PI solution is mixed with silicon dioxide, silicon carbide and/or beryllium oxide, further with the composition B, and further with lanthanum oxide, cerium oxide and/or lanthanum cerium oxide, preferably at 35-45° C. and under a vacuum of –94 kPa to –101 kPa. In step (3), The rotation speed for stirring is preferably 8-12 r/min. In step (3), During the mixing of the PI solution with silicon dioxide, silicon carbide and/or beryllium oxide, the stirring lasts for preferably 10-15 min. After the addition of the composition B, the stirring lasts for preferably 15-20 min. After the addition of lanthanum oxide, cerium oxide and/or lanthanum cerium oxide, the stirring lasts for preferably 15-20 min. In the present invention, the silicon dioxide is nanometer-scale silicon dioxide, preferably with a particle size of 100 nm-500 nm. The silicon carbide is nanometer-scale silicon carbide, preferably with a particle size of 100 nm-500 nm. The beryllium oxide has preferably a purity of 99.95%. Since the compound is highly toxic, its usage should be under strict control. In step (3), the total amount of silicon dioxide, silicon carbide and beryllium oxide is 32-35 parts by weight, and the amount of beryllium oxide, if it is used, is preferably 5-15 parts by weight. In step (3), silicon dioxide is preferably added stepwise. In step (3), the amount of the composition B is the total amount of the composition B obtained from the preparation in step (2). In the present invention, the lanthanum oxide, cerium oxide and lanthanum cerium oxide are ultra fine lanthanum oxide, cerium oxide and lanthanum cerium oxide (preferably with a particle size of 1 μm-5 μm). In step (3), one or more selected from lanthanum oxide, cerium oxide, and lanthanum cerium oxide can be used in an total amount of 0.5-0.7 parts by weight.

PI possesses ideal properties such as high isolation, anti-static ability, high pressure strength and fine plasticity, but has a limited application at high temperature due to its polymeric characteristics. In order to combine the plasticity for micrometer-scale fine processing of PI and the high resistance to high and low temperatures without retraction under high temperature sintering of the inorganic compounds, the components are adjusted in the present invention to achieve the ion chelation and metallographical structure at a certain ratio according to the mutual dependence of the curing process and the temperature, so that the properties of a low massive specific weight, lightweight, high strength and resistance to high temperature are realized.

The PVAc suitable for the present invention is of industrial grade or better. The purity of PVAc is preferably 99.9% or higher. The characteristic viscosity of the PVAc suitable for the present invention is preferably 0.7-0.9 dL/g. In the present invention, the PVAc solution is an aqueous solution of PVAc. In step (4), the amount of PVAc is 12-13 parts by weight, i. e. the PVAc contained in the PVAc solution used is 12-13 parts by weight. In step (4), the solid content in the PVAc solution used is 70-80 wt %, for example about 73-77 wt %. In step (4), the amount of the composition A is the total amount of the composition A obtained from the preparation in step (1). In step (4), After the addition of the composition A, the stirring lasts for preferably 15-25 min. In step (4), the amount of the composition C is the total amount of the composition C obtained from the preparation in step (3). In step (4), the mixture of the composition A and the PVAc solution is mixed with the composition C preferably at 35-45° C. and under a vacuum of −94 kPa to −101 kPa. In some embodiments, the mixture of the composition A and the PVAc solution is added to the composition C obtained in step (3) at 35-45° C. and under a vacuum of −94 kPa to −101 kPa. The mixture of the composition A and the PVAc solution is mixed with the composition C preferably at a stirring speed of 8-12 r/min. In some embodiments, when the mixture of the composition A and the PVAc solution is mixed with the composition C, a polar solvent is added to adjust the viscosity of the PMTS material composition to 90000±10000 cP. In a preferable embodiment, when the mixture of the composition A and the PVAc solution is mixed with the composition C, a polar solvent is added, heated to 45-52° C. and stirred at a rotation speed of 8-12 r/min, to adjust the viscosity of the PMTS material composition to 90000±10000 cP. The PMTS material composition according to the present invention is a bubble-free white solid-liquid mixture with a certain viscosity, preferably 90000±10000 cP. The PMTS material composition according to the present invention can be stored stably at the viscosity of 90000±10000 cP.

In accordance with the improved properties of the organic-inorganic composite, the components of the organic phase and the inorganic phase are adjusted in the invention, so as to obtain a PMTS material composition by a chelation-affinity reaction between organic and inorganic ions. The PMTS material composition exhibits the horizontal extension of PI and can be formed as a thin film having a thickness of a dozen micrometers. Through the desolvation at 50° C.-60° C., three applications with different properties can be obtained: 1. Application with the bendability of PI in liquid state until in plastic solid phase; 2. Application with the plasticity of PI after binder removal, in processing delicate micrometer-scale structures; 3. Application with light-weight, high hardness and precision after binder removal until high temperature sintering.

The PMTS material composition can be cured at a normal temperature under normal pressure, and the following products/materials can be prepared as required, which 1. can be processed into performance thin film having a thickness of tens of micrometers to hundreds of micrometers; 2. can be either manufactured into delicate parts through injection molding or sintered at a high temperature; 3. can be made into various profiles, which are then subjected to high temperature sintering and precision processing; 4. can produce a high pressure hydrogen storage structure according to the present invention through precision processing and high temperature sintering.

The PMTS material composition can be used to produce a solid semi-finished product through curing at 40-45° C., heating at 50-60° C. and high temperature processing at 360-480° C. Therefore, the present invention further comprises a solid semi-finished product obtained by processing the PMTS material composition through the three steps at 40-45° C., at 50-60° C. and at 360-480° C. In the present invention, the duration of the curing at 40-45° C. is preferably 200-250 min, and during the curing at 40-45° C., the environmental humidity is preferably 8-12%. In the present invention, the duration of the heating at 50-60° C. is preferably 50-70 min, and the duration of the heating at 360-480° C. is preferably 50-70 min. In some embodiments, The PMTS material composition can be used to produce a solid semi-finished product through curing at 40-45° C. for 200-250 min, processing at 50-60° C. for 50-70 min, and binder removal (the colloquial word for the decomposition of polymer materials into gas phase at a high temperature) at 360-480° C. for 50-70 min.

The PMTS material composition can be used to produce a semi-finished product with a metallographical structure through curing at 40-45° C., heating at 50-60° C., high temperature processing at 360-480° C. and high temperature sintering at 850-900° C. Therefore, the present invention further comprises a semi-finished product with a metallographical structure obtained by processing the PMTS material composition through the four steps at 40-45° C., at 50-60° C., 360-480° C. and at 850-900° C. In the present invention, the duration of the heating at 850-900° C. is preferably 80-100 min. In some embodiments, The PMTS material composition can be used to produce a semi-finished product with a metallographical structure through curing at 40-45° C. for 200-250 min, processing at 50-60° C. for 50-70 min, processing at 360-480° C. for 50-70 min and then sintering at 850-900° C. for 80-100 min.

The PMTS material composition can be used to produce a PMTS material through curing at 40-45° C., heating at 50-60° C., high temperature processing at 360-480° C., high temperature sintering at 850-900° C. and high temperature sintering at 1400-1450° C. Therefore, the present invention further comprises a PMTS material obtained by processing the PMTS material composition through the five steps at 40-45° C., at 50-60° C., 360-480° C., 850-900° C. and at 1400-1450° C. In the present invention, the duration of the heating at 1400-1450° C. is preferably 250-350 min. In some embodiments, The PMTS material composition can be used to produce a PMTS material through curing at 40-45° C. for 200-250 min, processing at 50-60° C. for 50-70 min, processing at 360-480° C. for 50-70 min, sintering at 850-900° C. for 80-100 min, and sintering at 1400-1450° C. for 250-350 min. When a method, in which the fifth step consists in sintering at 1400-1450° C., is used to prepare the PMTS material, the PMTS material composition used can be a PMTS material composition described herein comprising the following raw materials: polyimide, polyvinyl acetate, aluminum chloride, magnesium chloride, barium chloride, aluminum oxide, zirconium dioxide, lanthanum oxide and/or cerium oxide and/or lanthanum cerium oxide, silicon dioxide, sodium hydroxide and/or potassium hydroxide, yttrium oxide, titanium dioxide, hafnium dioxide, and optionally calcium chloride. Alternatively, it can be a PMTS material composition, in which part or all silicon dioxide in the raw materials is replaced by silicon carbide, part or all titanium dioxide is replaced by titanium carbide, part or all hafnium dioxide is replaced by hafnium carbide and/or zinc carbide is further contained therein. When part or all silicon dioxide in the raw materials is replaced by silicon carbide, part or all titanium dioxide is replaced by titanium carbide, part or all hafnium dioxide is replaced by hafnium carbide and/or zinc carbide is further contained therein, the total amount of carbides is preferably not more than 45%, more preferably not more than 30% of the total amount of carbides and oxides in the raw materials.

The similar wording, such as curing, curing treatment, heating, heating treatment, high temperature processing, high temperature sintering, sintering, sintering processing, are used herein to express the meaning of thermal treatment of a material at a certain temperature, usually placing the material in an environment at a certain temperature for a period of time. In the present invention, "processing at 50-60° C. for 50-70 min and at 360-480° C. for 50-70 min" means placing the material in an environment at 50-60° C. for 50-70 min, then transferring same to an environment at 360-480° C. and leaving it there for 50-70 min, and so on. In the present invention, the apparatuses for heating/high temperature processing/sintering are not particularly limited. In some embodiments, the heating/high temperature processing/sintering in the present invention are carried out in a tunnel kiln, where the kiln temperature in each segment is preset for stepwise sintering, for example, the tunnel kiln may comprise four segments respectively at 50-60° C., 360-480° C., 850-900° C. and 1400-1450° C. for the preparation of a PMTS material.

The PMTS material composition can be used to produce a PMTS material through curing at 40-45° C., heating at 50-60° C., high temperature processing at 360-480° C., high temperature sintering at 850-900° C. and sintering at 3000±100° C. Therefore, the PMTS material according to the present invention can be obtained by processing the PMTS material composition through the five steps at 40-45° C., at 50-60° C., 360-480° C., 850-900° C. and at 3000° C.±100° C. In the present invention, the method of sintering at 3000° C.±100° C. is not particularly limited, as long as the temperature can reach 3000° C.±100° C. For example, the sintering at 3000° C.±100° C. can be carried out using spark plasma sintering (SPS for short). The SPS suitable for the present invention can be any known SPS technology, such as direct current spark plasma sintering (DCS for short). In the present invention, the duration of the sintering using SPS at 3000° C.±100° C. is usually 1-10 s, preferably 3-6 s. If another method of sintering is adopted for the sintering at 3000° C.±100° C., the duration of sintering can be determined according to actual conditions. In some embodiments, the PMTS material composition can be used to produce a PMTS material through curing at 40-45° C. for 200-250 min, processing at 50-60° C. for 50-70 min, processing at 360-480° C. for 50-70 min, sintering at 850-900° C. for 80-100 min, and sintering at 3000° C.±100° C. When a method, in which the fifth step consists in sintering at 3000° C.±100° C., is used to prepare the PMTS material, the PMTS material composition used can be one that is described herein and comprises the following raw materials: polyimide, polyvinyl acetate, aluminum chloride, magnesium chloride, barium chloride, aluminum oxide, zirconium dioxide, lanthanum oxide and/or cerium oxide and/or lanthanum cerium oxide, silicon dioxide, sodium hydroxide and/or potassium hydroxide, yttrium oxide, titanium dioxide, hafnium dioxide, optionally calcium chloride. Preferably, it can be a PMTS material composition, in which part or all silicon dioxide in the raw materials is replaced by silicon carbide, part or all titanium dioxide is replaced by titanium carbide, part or all hafnium dioxide is replaced by hafnium carbide and/or zinc carbide is further contained therein. In the present invention, when the oxide in the raw materials for the PMTS material composition is replaced by a corresponding carbide (for example, silicon dioxide is replaced by silicon carbide, titanium dioxide is replaced by titanium carbide, hafnium dioxide is replaced by hafnium carbide) and zinc carbide is introduced into the raw materials for the PMTS material composition, these carbides can function as microelectrodes in the process of sintering, thereby facilitating the sintering at 3000° C.±100° C., particularly facilitating the sintering at 3000° C.±100° C. using SPS. When part or all silicon dioxide in the raw materials is replaced by silicon carbide, part or all titanium dioxide is replaced by titanium carbide, part or all hafnium dioxide is replaced by hafnium carbide and/or zinc carbide is further contained therein, the total amount of carbides is preferably not more than 45%, more preferably not more than 30% of the total amount of carbides and oxides in the raw materials.

It is understandable that, during the preparation of the solid semi-finished product, the semi-finished product with a metallographical structure and the PMTS material described herein using the PMTS material composition, the curing at 40-45° C. and the subsequent treatments are carried out after adjusting the viscosity of the PMTS material composition as required. For example, the viscosity of the PMTS material composition can be adjusted to 200000 cP±10000 cP by heating, before the curing at 40-45° C. and the subsequent treatments.

The PMTS material composition, the solid semi-finished product, the semi-finished product with a metallographical structure and the PMTS material according to the present invention are suitable for use in photoresist/precision molding/3D-printing and in the preparation of materials and special structures having resistances to high temperature, strong acids and bases, high pressure strength, flame retardancy, thermal isolation, high tensile stress, high antistatic ability, strong electrical isolation, high hardness and/or micrometer-scale plastic delicate micropores. The feature of the PMTS material of the present invention also lies in that it does not react chemically with hydrogen.

The high pressure hydrogen storage structure according to the present invention is made by impregnating polymer fibers with the PMTS material composition, followed by curing and sintering, and is thus referred to as hydrogen storage structure of PMTS material. In particular, the high pressure hydrogen storage structure can be obtained by impregnating the polymer fibers with the PMTS material composition, curing at 40-45° C. for 200-250 min, processing at 50-60° C. for 50-70 min, processing at 360-480° C. for 50-70 min, sintering at 850-900° C. for 80-100 min, and then sintering at 1400-1450° C. for 250-350 min or sintering at 3000° C.±100° C.

The high pressure hydrogen storage structure of the present invention has a honeycomb-like structure (as shown in FIG. 1). During the impregnation of the polymer fibers with the PMTS material composition, the polymer fibers are impregnated in the form of a fiber bundle. The surface of the individual fibers in the impregnated fiber bundle is coated with the PMTS material composition at a certain thickness, and the neighboring individual fibers are adhered together, so that the individual fibers are arranged in a honeycomb-like shape in the cross section of the fiber bundle. After sintering of the fiber bundle impregnated with the PMTS material composition, the polymer fibers are decomposed into gas phase, leaving micropores with a honeycomb-like structure (also called single pore tubes), while the PMTS material composition on the surface of the fibers form the PMTS material, which builds the pore wall of the honeycomb-like structure. The term of honeycomb-like structure herein has its common meaning, i. e. each micropore is surrounded intimately by 6 neighboring micropores in the cross section. It is understandable that a micropore herein is considered to be a single pore tube with a certain aspect ratio and that the diameter of the micropore (i. e. the inner diameter of the single pore tube) is usually 100-200 μm. The above-mentioned honeycomb-like structure and the microporous structure of the hydrogen storage structure according to the present invention can also be referred to as honeycomb-like microporous structure. The tube walls of neighboring single pore tubes are herein merged into a whole, and thus the thickness of the tube wall of a micropore refers to the thickness of the emerged tube wall of two neighboring single pore tubes.

The hydrogen storage structure of the PMTS material has the following outstanding advantages: it exhibits a low massive specific weight and a plasticity precision error of ±2 μm; a honeycomb-like microporous structure with a pore diameter of 150 μm and a tube wall thickness of 35 μm has a critical pressure strength of >200 MPa and a Rockwell hardness of 86-89, resistance to high temperature of >1900° C. and low temperature of <−260° C., low heat conductivity, high thermal isolation, and high endurance to strong acids and bases; the hydrogen storage structure of the PMTS material is very stable in an operating atmosphere of hydrogen in high density and under complex dynamic conditions.

Currently, in the technical field of materials, the materials capable of realizing a clustered honeycomb-like structure with a certain pressure strength include the following finished materials: quartz glass capillary, fibers of the fourth grade, metallic materials inert to hydrogen, organic polymer capillary, millimeter-scale inorganic ceramic honeycomb-like structure, and the like. In the research on these materials, the inventors have found that, although each of these materials possesses its own advantages, they are not suitable for the application in hydrogen atmosphere at high pressure due to their properties and processes, which are reflected in particular in the problems such as susceptibility to aging by hydrogenation, temperature-rising reaction sensitive to hydrogen, high massive specific weight, uncertainty such as presence of defects in finished products, high costs in defect removal, high material costs and high reprocessing costs. The high pressure hydrogen storage structure of the present invention is formed according to the desired ideal material properties and the controllable quality of the micrometer-scale microporous honeycomb-like structure.

In the present invention, a reliable storage structure with a high hydrogen density, high safety and high stability is established on the basis of the pressure relationship at a tiny volume and massive specific weight, where the critical determinant is the PMTS material properties realized by optimization between organic and inorganic compounds. In view of the high risk in the high pressure operation of a hydrogen storage container, research has been carried out on the processing techniques of the highly safe and stable honeycomb-like structure, which can be realized using the developed PMTS material in combination with the micrometer-scale pore diameter. It is difficult to processing a honeycomb-like grid structure consisting of about 14000 micropores and having a pore diameter of 150 μm, a thickness of pore wall of about 35 μm and a depth of 600 mm into a profile of PMTS material with a Rockwell hardness of 86-89 and a diameter of about 25 mm, by means of these conventional precision processing techniques for pores of micrometer-scale diameter. After research and development, the following solution is purposed by the present invention: The solution takes advantages of the adhesion of the fine liquid phase in the PMTS material composition as well as the high precision in high temperature melting and sintering and the high strength of the wall having a thickness of tens of micrometers in the fine metallographical structure. A backbone is formed by the spatial volume occupied by the polymer fibers having a micrometer-scale diameter. Then micrometer spaces are formed through thermal decomposition of the fibers at a high temperature, and at the same time, the cured micrometer-scale coating of PMTS builds partitioning tube walls of intimately connected micrometer spaces after high temperature sintering, thereby creating a micrometer-scale porous honeycomb-like structure.

The hydrogen storage structure of the PMTS material according to the present invention can be prepared by a method comprising the following steps:

(1) impregnating a polymer fiber bundle with the PMTS material composition;

(2) curing the polymer fiber bundle impregnated with the PMTS material composition at 40-45° C., processing at 50-60° C., processing at 360-480° C., sintering at 850-900° C., and then sintering at 1400-1450° C. or sintering at 3000° C.±100° C.

Thus, the hydrogen storage structure of the PMTS material is obtained.

In step (2), the preferable processing conditions (e. g. the duration) for the curing at 40-45° C., the processing at 50-60° C., the processing at 360-480° C., the sintering at 850-900° C., the sintering at 1400-1450° C. and the sintering at 3000° C.±100° C. are as described above in any embodiment.

In the difficulties that need to be overcome by the present invention, the key points are the improvement in terms of the retraction and deformation during high temperature sintering and the high reject rate, for which the following requirements need to be fulfilled: a relatively high stability to withstand the procedure of high temperature sintering; a relatively low massive specific weight by means of the metallographical phase, resistance to a high temperature higher than 1900° C. and to a low temperature lower than −260° C.; a pressure strength limit of more than 200 MPa for a hydrogen storage structure with a pore diameter of 100-150 μm/a tube wall thickness of 35 μm; a high tensile stress, a Rockwell hardness of about 86 and a relatively high thermal isolation factor for a resultant honeycomb-like mechanical structure. Through the preferable selection of the process parameters in step (2) of the present invention, the requirements described above are met.

In some embodiments, in order to provide a proper adhesion and flowability, the viscosity of the PMTS material composition is adjusted to 200000 cP±10000 cP by heating before the impregnation of the polymer fiber bundle. Preferably, the PMTS material composition is processed at 40-45° C. and its viscosity is adjusted to 200000 cP±10000 cP. In some embodiments, the PMTS material composition has an initial viscosity of 90000±10000 cP. The amount of the PMTS material composition is usually such that the polymer fibers can fully immersed therein. In some embodiments, the level of the PMTS material composition should be 10 mm above the fibers, after the polymer fibers are fully immersed in the PMTS material composition.

The material suitable for the polymer fibers according to the present invention are not particularly limited, as long as it has a melting point of 150° C.-380° C. The polymer fiber can for example include but not limited to continuous fibers or filaments from polymers such as polyvinyl chloride (PVC), polystyrene (PS), ABS plastic, polyethylene (PE), polypropylene (PP), polycarbonate (PC), polyurethane (PU), polyamide (PA, Nylon, chinlon). The diameter of the polymer fiber can be in the scale of micrometer to millimeter, for example 70 μm to 5000 μm. The polymer fiber of a suitable diameter can be selected according to the size of the micropores as required. In some embodiments, the diameter of the polymer fiber is 100-150 μm, for example 140-150 μm. The length of the polymer fiber is preferably 10 mm or more. The upper limit of the length of the polymer fiber is not particularly limited, as long as the polymer fiber bundle impregnated with the PMTS material composition does not deform during the high temperature sintering. A polymer fiber with small error in relation to diameter, low impurity content and consistent flexibility is preferably used in the present invention.

The number of fibers in the fiber bundle is not particularly limited and may be for example 10000 to 200000. The relationship between the volume of bundle before and after the impregnation is as follow: Volume of bundle after impregnation=Volume of bundle before impregnation+Volume of coating for impregnating the bundle. The method of impregnation of the polymer fiber bundle with the PMTS material composition is not particularly limited, as long as the surface of the individual fibers in the impregnated fiber bundle is coated with the PMTS material composition at a certain thickness, and the neighboring individual fibers are adhered together. In some embodiments, the two ends of the fiber bundle are secured (for example, with hanging clamps), and a length (for example, of about 50 mm) at each end of the fiber bundle remains out of the impregnation liquid. The fiber bundle is immersed into the PMTS material composition, and then the two ends are pushed to the middle so that the fiber bundle become loose. This step is repeated several times, until the surfaces of the fibers are coated with the PMTS material composition having a certain thickness. The fiber bundle is removed and cut into two equal halves while the ends are tightened. Then the ends are oriented vertically, so that the bundle is automatically adhered by means of a dripping process of the PMTS material composition with balanced tension and gravity force. In the present invention, the average thickness of the coating on the single fibers in the polymer fiber bundle impregnated with the PMTS material composition is preferably 25-30 μm.

In some embodiments, in step (2), the polymer fiber bundle impregnated with the PMTS material composition is firstly filled into a tubular mold, cured at 40-45° C., processed at 50-60° C., processed at 360-480° C., sintered at 850-900° C., and sintered at 1400-1450° C. or sintered at 3000° C.±100° C., so that an individual tube with a hydrogen storage structure (referred to as individual hydrogen storage tube for short) can be prepared. It is understandable that, since the PMTS material cures at normal temperature under normal pressure, it is necessary to fill the fiber bundle impregnated with the PMTS material composition into the tubular mold before it cures. In the present invention, the tubular mold is preferably made by the PMTS material or the PMTS composite material according to the invention. The PMTS composite material according to the present invention comprises or consists of the PMTS material according to the present invention and a reinforcement filler, and can be obtained by adding a reinforcement filler into the PMTS material composition according to the present invention and then processing in the five steps at 40-45° C., at 50-60° C., 360-480° C., 850-900° C. and at 1400-1450° C. described herein. The reinforcement filler suitable for the PMTS composite material according to the present invention can be any known reinforcement filler with lightweight and high strength, which is used to reduce the specific weight or increase the strength of the PMTS material. The reinforcement filler for example can be carbon fibers. The amount of the added reinforcement filler can be determined as required. The form of the tubular mold suitable for the present invention is not particularly limited, as long as it can load and confine the shape of the fiber bundle impregnated with the PMTS material composition. For example, the tubular mold may comprise an inner tube and a sleeve. The cross-sectional shape of the tubular mold is not particularly limited, and may be for example hexagon, circle, rectangle, square, triangle, convex and concave fitted shape, parallel polygon and the like. In order to facilitate filling, the inner tube can be divided into two halves. The two halves of the inner tube are each filled fully with fibers for the bundle and are adhered together after flattening, so as to finish the filling. The wall thickness of the inner tube can be 150 μm-300 μm. The cross-sectional area of the space in the inner tube is preferably 69 mm²-1940 mm². For example, the outer diameter of the inner tube with a circular cross section is preferably 10 mm-50 mm. It is understandable that the length of the tubular mold matches the length of the polymer fibers, usually slightly shorter than that of the filled polymer fibers. The sleeve has two open ends. It is understandable that the length, cross-sectional shape and size of the sleeve match those of the inner tube, for example, the cross-sectional shape of the sleeve is usually the same as that of the inner tube, the inner diameter of the sleeve is usually slightly larger than the outer diameter of the inner tube, and the lengths of the sleeve and of the inner tube are often identical. The wall thickness of the sleeve is preferably 1.0 mm-2.5 mm, e. g. about 1.5 mm. In some embodiments, after the inner tube is inserted into the sleeve, they are sealed with the PMTS material composition (for example with a PMTS sealing solution having a viscosity of 1000000±20000 cP, which is obtained by adjusting viscosity through removing solvent from the PMTS material composition), sheathed with a plastic sealing film, and then subjected to the curing at 40-45° C. and other subsequent processes. It is understandable that, the part of the fiber for the bundle, which has not been immersed, can be trimmed as required in step (2) before the processing at 50-60° C.

The high pressure hydrogen storage structure according to the present invention is obtained by subjecting the polymer fiber bundle impregnated with the PMTS material composition to the process in step (2), or an individual tube with a honeycomb-like hydrogen storage structure according to the present invention (referred to as individual tube for short) is obtained by filling the fiber bundle into the tubular mold and subjecting same to the process in step (2). Therefore, the individual tube of the present invention comprises the high pressure hydrogen storage structure according to the present invention and a tube wall (also called casing, resulting from the tubular mold used in the preparation of the individual tube) of the individual tube. After sintering, the high pressure hydrogen storage structure and the tubular mold (such as the inner tube and the sleeve) merge into a whole.

Figure 2:
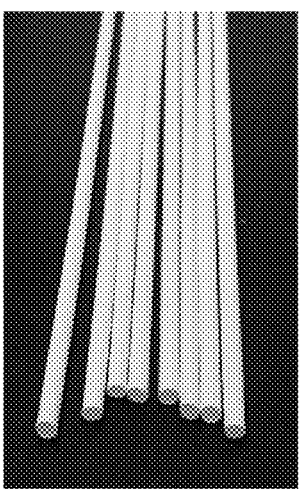
FIG. 2 is the photo of an individual cylindric tube unit of the invention.

The wall thickness of the micropore of the high pressure hydrogen storage structure according to the present invention is preferably 35-40 μm and the diameter of the micropore is preferably 140-150 µm. The individual tube of the present invention can be made into a plurality of shapes and applied in special designs and special equipment. The cross-sectional shape of the individual tube includes but not limited to hexagon, circle, rectangle, square, triangle, convex and concave fitted shape, parallel polygon and the like. The length of the body of the individual tube is favorably not more than 800 mm. The cross-sectional area of the high pressure hydrogen storage structure of the individual tube is not particularly limited. For example, in an individual tube having a circular cross section, such as that for a mobile vehicle with a hydrogen storage, the diameter of the high pressure hydrogen storage structure of the individual tube can be chosen between 10 mm and 50 mm for optimization. For the applications in the transport of mobile hydrogen storages and in mobile hydrogen filling stations, including large-scale hydrogen storage stations and large-scale mobile vehicles such as ships and electric multiple units, the diameter may reach up to 200 mm. According to the size of the high pressure hydrogen storage structure in the individual tube, the thickness of the tube wall of the individual tube may be 1-15 mm, e. g. 1-5 mm. In some embodiments, as shown in FIG. 2, the individual tube according to the present invention is a circular tube with an outer diameter of 25 mm, an inner diameter (the diameter of the high pressure hydrogen storage structure) of 22 mm and a length of 600 mm, the pore diameter of the micropores is 150 µm, the wall thickness of the micropores is 35 µm, the volume of a single micropore (also called single pore tube) is 10.5975 $mm^3$, the number of single pore tube is about 14,000, and the total hydrogen storage volume of the individual tube is 148365 $mm^3$.

The hydrogen storage structure of the PMTS material according to the present invention can meet the requirements for hydrogen storage at 70 MPa and is especially suitable for the storage of gaseous hydrogen under high pressure. Moreover, the PMTS material according to the present invention exhibits excellent resistance to low temperature, so that a double-layer vacuum structure with a form similar to an inner pot of a thermos flask made by the PMTS material, when combined with a highly thermally isolating material, can be used to store liquefied hydrogen at an ultra low temperature. Therefore, the present invention also includes the application of the PMTS material according to the present invention in high pressure hydrogen storage and storage of liquefied hydrogen.

After the individual tubes described above are manufactured, N individual tubes are placed into a matching shaping tube for PMTS to form a tube bundle according to a preset shape and diameter for the bundle of individual tubes. By placing the N tubes in a module box of the honeycomb-like grid structure, a module having excellent extensive properties is obtained. N modules can be very flexibly combined to create the required volumes and shapes. An ultra high volume required can also be realized by parallel connecting a plurality of the arrangements having N modules. Using the micrometer-scale, microporous, honeycomb-like individual hydrogen storage tubes with a small volume, high pressure strength, high safety and high stability, any desired volume can be obtained by combining N tube bundles into a module (hereafter referred to as module). Through the properties of the material and the structure, a method for high pressure hydrogen storage with high safety and stability is thus realized. Any hydrogen storage volume may be achieved by combining N individual tubes into a tube bundle and N tube bundles into a module. The pressure, at which the module can store hydrogen safely, is 70 MPa-110 MPa, with the pressure limit being higher than 200 MPa and the safety factor for hydrogen storage at 100 MPa being 2.3.

Based on the total mass of the PMTS material, the PMTS material according to the present invention generally comprises the following components: 15-50 wt % of silicon dioxide, 0.5-5 wt % of transitional metal oxides, 45-85 wt % of metal oxides and unavoidable impurities. The transitional metal oxides comprise one or more of lanthanum oxide, cerium oxide, lanthanum cerium oxide and yttrium oxide, preferably yttrium oxide and one or more of lanthanum oxide, cerium oxide and lanthanum cerium oxide. In the PMTS material, if present, the total content of lanthanum oxide, cerium oxide, and lanthanum cerium oxide is preferably 0.2-1 wt %, and the content of yttrium oxide is preferably 0.5-5 wt %. The metal oxides may comprise one or more of aluminum oxide, zirconium dioxide, titanium dioxide, hafnium oxide, potassium oxide, sodium oxide, magnesium oxide, calcium oxide, zinc oxide, and beryllium oxide, and preferably comprise the following components: aluminum oxide, zirconium dioxide, titanium dioxide, hafnium oxide, potassium oxide and/or sodium oxide, magnesium oxide, optionally zinc oxide, optionally calcium oxide, and optionally beryllium oxide. In the PMTS material, if present, the content of aluminum oxide is preferably 15-30 wt %, the content of zirconium dioxide is preferably 15-35 wt %, the content of titanium dioxide is preferably 5-15 wt %, the content of hafnium oxide is preferably 0.1-10 wt %, the total content of potassium oxide and sodium oxide is preferably 0.1-1 wt %, the content of magnesium oxide is preferably 0.1-0.5 wt %, the content of barium oxide is preferably 1-2 wt %, the content of calcium oxide is preferably 0.05-1 wt %, the content of zinc oxide is preferably 0-10 wt %, and the content of beryllium oxide is preferably 1-20 wt %.

Preferably, based on the total mass of the PMTS material, the PMTS material comprises or consists of the following components: 33-39 wt % of silicon dioxide and/or beryllium oxide, 17-22 wt % of aluminum oxide, 20-28 wt % of zirconium dioxide, 6-10 wt % of titanium dioxide, 0.25-0.5 wt % of hafnium oxide, 0.45-0.9 wt % of lanthanum oxide, cerium oxide and/or lanthanum cerium oxide, 1-2.7 wt % of yttrium oxide, 0.12-1 wt % of potassium oxide and/or sodium oxide (for example 0.1-0.2 wt % of potassium oxide and 0.5-0.9 wt % of sodium oxide), 0.18-0.4 wt % of magnesium oxide, 1-1.7 wt % of barium oxide, 0-10 wt % of zinc oxide, optionally 0.07-0.7 wt % of calcium oxide, and unavoidable impurities. In the present invention, the unavoidable impurities generally include one or more of carbon, chrome oxide, iron (III) oxide, and may also include mercury, arsenic, phosphorus, manganese, copper, zinc and the like. Based on the total weight of the PMTS material, if present, the content of carbon is generally 0.013-0.015 wt %. Based on the total weight of the PMTS material, if present, the content of chrome oxide is generally 0.01-0.02 wt %. Based on the total weight of the PMTS material, if present, the content of iron (III) oxide is generally 0.01-0.015 wt %. It is understandable that the iron (III) oxide and chrome oxide come from trace constituents contained in the raw materials, and that carbon is the residue from the sintering of polymers or carbides. In some embodiments, based on the total mass of the PMTS material, the PMTS material comprises 0.013-0.015 wt % of carbon, 0.01-0.015 wt % of iron (III) oxide and 0.01-0.02 wt % of chrome oxide. In the present invention, the total content of unavoidable impurities other than carbon, chrome oxide, and iron (III) oxide, including, for example, mercury, arsenic, phosphorus, manganese, copper, zinc and the like, generally makes up 0.01 wt % of the total mass of the PMTS material. In some embodiments, the 33-39 wt % of silicon dioxide and/or beryllium oxide contained in the PMTS material is composed of: 33-39 wt % of silicon dioxide; or 33-39 wt % of silicon dioxide and beryllium oxide, wherein the amount of beryllium oxide is preferably 3-15 wt %, e. g. 3-13 wt % or 5-15 wt %, of the total mass of the PMTS material.

In some embodiments, if the PMTS material is prepared by a PMTS material composition free of zinc carbide, then this PMTS material comprises or consists of the following components, based on the total mass of the PMTS material: 37-39 wt % of silicon dioxide and/or beryllium oxide, 19-22 wt % of aluminum oxide, 23-28 wt % of zirconium dioxide, 7-10 wt % of titanium dioxide, 0.3-0.5 wt % of hafnium oxide, 0.5-0.9 wt % of lanthanum oxide, cerium oxide and/or lanthanum cerium oxide, 1.2-2.7 wt % of yttrium oxide, 0.12-1 wt % of potassium oxide and/or sodium oxide (for example 0.1-0.2 wt % of potassium oxide and 0.5-0.9 wt % of sodium oxide), 0.2-0.4 wt % of magnesium oxide, 1.2-1.7 wt % of barium oxide, optionally 0.08-0.7 wt % of calcium oxide, and unavoidable impurities. In these embodiments, the 37-39 wt % of silicon dioxide and/or beryllium oxide contained in the PMTS material may be: 37-39 wt % of silicon dioxide; or 37-39 wt % of silicon dioxide and beryllium oxide, wherein the amount of beryllium oxide is preferably 5-18 wt %, e. g. 7-18 wt % or 5-15 wt %, of the total mass of the PMTS material.

Solutions comparable to that of the present invention: Micrometer-scale glass capillaries are usually applied in non-pressure uses, but can also be utilized with regard to high pressure hydrogen storage as bundle material for hydrogen storage at a certain pressure. It has the advantages of being able to satisfy the requirements of hydrogen storage at 70 MPa, and having a pressure strength limit of 140 MPa and a safety factor of 2. Its disadvantages lie in that: 1. It has low potential in development, due to the pressure strength limit determined by the material. 2. Due to the raw materials and processes, the defects such as impurities/bubbles/cracks occur very frequently and are difficult to be found by bare eyes. Defects on one capillary might lead to collapse under high pressure and thus to the leakage in the whole common hydrogen storage system. The quality control of the hydrogen storage container bundled from hundreds of thousands of capillaries is difficult, causing high safety risk. 3. The application of glass capillaries with micrometer-scale pores in hydrogen storage container results in high costs=(1) application cost per capillary×hundreds of thousands of capillaries+(2) rejection cost of defective capillaries+(3) costs for high temperature sealing of each of the capillaries and rejection cost of defectively sealed capillaries+(4) costs for adhesive bundling of N capillaries+(5) time cost.

In comparison with micrometer-scale glass capillaries, the present invention has the following outstanding advantages:
1. The PMTS material, which is designed for the new high pressure hydrogen storage structure in an oriented way, and the individual tube having the integral honeycomb-like hydrogen storage structure with micrometer-scale pores, which is produced by a special process, are subjected to intelligent sintering at a high temperature and have the properties of a light specific weight, high degree of finish, high precision, high hardness, high consistency in process quality, thereby being suitable for applications of broad spectrum.
2. The properties of the honeycomb-like PMTS structure with micrometer-scale pores exceed twice the limit of a quartz capillary, and the honeycomb-like structure in a micrometer tube with a pore diameter of 150 μm and a wall thickness of 35 μm has a pressure strength of >200 MPa.
3. Comparison of production costs: The individual tube having a microporous honeycomb-like structure with a diameter of 25 mm contains 14000 micropores with a pore diameter of 150 μm and has a length of 600 mm. The production cost of the tube in a mass production line is only one third of that of a quartz capillary with a pore diameter of 150 μm and a length of 1000 mm.
4. Analysis of metallographical structure and aging experiments for PMTS material: The continuous service life of a hydrogen storage container having a honeycomb-like microporous PMTS structure is greater than 20000 hours, which is more than twice that of a quartz capillary (8000 hours).

The present invention has the following advantages:
1. The present invention provides a PMTS material for a hydrogen storage container (referred to as PMTS, short for organic polymer PI+inorganic metallographical structure), which has a light weight, resistances to high pressure, high temperature, strong acids and bases, high safety and high stability, and can be used to replace imported high quality carbon fibers to achieve a higher mass density in hydrogen storage.
2. On the basis of this PMTS, a micrometer-scale microporous honeycomb-like integral high pressure hydrogen storage structure is invented, in which the adverse chain reaction caused by the active collision of hydrogen is limited by the tiny hydrogen storage space of micrometer pores. In complex dynamic operation conditions, the structure exhibits high pressure hydrogen storing ability at 70 MPa-110 MPa with high safety and high stability, a safety factor of more than 2 and a size reduction of 50% compared with a carbon fiber container of the same pressure strength and volume, which is superior to the huge and cumbersome size of a container coated with CFRP. The micrometer-scale microporous honeycomb-like high pressure hydrogen storage structure of the present invention can be made conveniently into a variety of shapes with high ease and flexibility in application. This technology has a promising prospective as it better suits the domestic situation in China.
3. The combination of PMTS material and honeycomb-like structure with micrometer-scale pores has the following outstanding advantages:
(1) Massive specific weight of about 5.2 g/cm³.
(2) Fast gas filling: only a few seconds for the same volume, substantially faster than the gas filling standard of 5 kg/3 min.
(3) Small to miniaturized size: The micrometer-scale microporous honeycomb-like structure exhibits very high hydrogen storage capability, thereby omitting the thick and cumbersome carbon fiber layer and reducing the size of the hydrogen storage module to half of the size of a carbon fiber container with the same pressure containment. The individual tube for hydrogen storage has flexibility in arrangement, so that it can be reasonably hidden in plane wings, vehicle carriage plates, vehicle bottom plates or any wall panels by means of scientific designs. The micrometer-scale microporous honeycomb-like structure for high pressure hydrogen storage can be miniaturized and cannot only be combined with a miniature hydrogen fuel battery (the combined size being similar to that of a cigarette box), but also used as wearable miniature mobile power supply.

(4) Hardness: Rockwell 86-89.

(5) High pressure strength: Through the excellent properties of the PMTS material and the mechanical structure of the micrometer-scale microporous honeycomb-like grid, the hydrogen storage at a pressure of 70 MPa-110 MPa can be easily achieved with a safety factor of 2.3. In comparison tests on high pressure hydrogen storage with a quartz capillary bundle having a high massive specific weight, the quartz glass capillary bundle breaks at 140 MPa, while the individual tube having the microporous honeycomb-like structure of PMTS can withstand the pressure of 200 MPa with a surplus.

(6) Large volume for hydrogen storage: The storage of hydrogen in high density with a miniature size and resistance to high pressure can be realized through a module formed by parallel bundling of individual tubes and through the parallel connection of any number of such modules, creating a hydrogen vehicle, high density hydrogen transport, mobile hydrogen filling station or large-scale hydrogen storage station in any volume.

(7) High stability: The module has a tensile stress of 3200 MPa, resistance to high temperature of >1900° C., resistance to acids and bases between pH 3-14, and good safety and stability in unpredictable and uncontrollable conditions.

(8) High safety: Owing to the densely distributed micropores, the microporous honeycomb-like PMTS structure disintegrates the turbulence of fluid under the impact of the hydrogen flow at a high pressure, thereby preventing a rising of temperature at a high pressure. Its microporous honeycomb-like structure effectively limits the dynamic activation energy of hydrogen in any dynamics, so that the inner stress produced by an unpredictable ultra high pressure can be instantly disintegrated in the honeycomb-like structure. Thus, the damage caused by the inner stress due to the rising of temperature at a high pressure and a high flow rate can be effectively avoided, thereby guaranteeing the stability of the quality of the container and the high safety thereof.

(9) Long service life: more than 20000 hours of continuous service life, almost three times that of a quartz capillary.

(10) Economically beneficial: It has a solid structure, a very low defect rate, a long service life, and costs only 30-40% of a carbon fiber container.

4. The bundled hydrogen storage module formed by the PMTS and the microporous honeycomb-like structure of the present invention realizes a high pressure hydrogen storage at a pressure higher than 100 MPa with high safety, high stability, light weight and reduced volume, creating a breakthrough in the technical approaches for hollow hydrogen storage, the mass density of which relies on CFRP in the past. In comparison with the application limit of 70 MPa for the high pressure hydrogen storage with CFRP technology, PMTS and the microporous honeycomb-like structure still have a large potential in terms of high pressure hydrogen storing capability and in terms of the hydrogen energy sectors in which the structure can be applied. The module of the bundle of microporous individual tubes according to the present invention is not limited to any volume and shape. The hydrogen storage method with high safety/stability according to the present invention can greatly facilitate the popularization of the application of hydrogen energy due to its benefit in application and economic gains. The present invention is capable of withstanding various complicated operation environments in the field of special applications and has a larger application potential in the field of mobile power generation with miniature hydrogen fuel battery.

Hereafter, the present invention will be described in conjunction with particular embodiments, in order to provide better understanding of the content of the invention. It should be understood that these embodiments are only illustrative, but not limiting. Unless otherwise stated, the raw materials and agents used in the embodiments are commercially available. Unless otherwise stated, the experiment methods, preparation methods and test methods used in the embodiments are conventional methods or methods that are recommended by the manufacturers. Unless otherwise stated, the instruments used in the embodiments are all conventional instruments in the art. Unless particularly stated, the percentage value in the embodiments refers to a mass percentage.

In the following embodiments, the highly pure oxides (of purity grade 4 N, 5 N and 6 N) except the highly-pure and ultra fine hafnium oxide and ultra fine lanthanum oxide are ultra fine powder with a fineness of more than ten thousands, which are collected after crushing and suspending fine powder with a high pressure gas flow. The metal oxide particles are all nanometer-scale highly pure raw materials.

The materials/properties of products/instruments for property measurements/experiment method and equipment/conditions used herein are listed below:

1. Quality measurement of raw materials: Thermo Fisher Niton XL5 handheld alloy analyzer.

2. Elemental analysis for intermediate products and end products: Thermo Fisher ARL Perform'X 4200 XRF Sequential X-Ray Fluorescence Spectrometer; maximal output power of X-ray generator: ≥4.2 kW, nominal voltage: ≥70 kV, nominal current: ≥140 mA; X-ray tube: Rh target, X-ray tube with ceramic terminal window, not lower than 4.2 kW; thickness of beryllium window: ≤50 μm; excitation distance of sample: ≤16 mm; irradiation: irradiation from below, i. e. the sample lies above the X-ray tube; solid-state high-frequency generator: 1% of fluctuation of outer voltage, ±0.00005% of stability of output voltage, ensuring high precision in tests; scanning: continuous scanning; detector: a gas proportional counter and a scintillation counter, which are arranged parallel to each other in the spectroscopic chamber; detection: sequential detection with automatic recording; the samples should be free of any contamination.

3. Viscosity measurement: NDJ-8S rotational digital viscometer.

4. Metallographical analysis: Carl Zeiss Axio Lab A1 Pol stand metallographical microscope of research grade.

5. Tests for resistance to acid and base: pH 3 test: Several cubes having a size of 30 mm$^3$ were cut by laser from a PMTS sample plate without fine polishing, and were examined under microscope and stored for later use. In a laboratory environment at 25° C., the cubes were immersed in a glass beaker filled with ethanol and enclosed for 30 min. The cubes were taken out with a bamboo tweezer and placed on a dry filter paper bowl for 20 min. Three cubes were put into a glass beaker filled with a hydrochloric acid solution at pH=3 in an operation box, sealed and left still standing for 24 hours before they were removed, rinsed with fresh water and dried with a drying paper. pH 14 test: The glass beaker filled with an hydrochloric acid solution at pH=3 in the operation box was replaced with a glass beaker filled with a sodium hydroxide solution at pH=14, while the remaining steps were the same as those of the pH 3 test. Standards for microscopic pH texture examination and evaluation: Standard practice for microetching metals and alloys ASTM E407-07 (Reapproved 2015) e17.1-7.15.

6. Test for resistance to high temperature: A tester for thermal conductivity coefficient is used. The test simulated a temperature of 60° C., which corresponded to the temperature in a vehicle under insolation in summer.

7. Charpy impact tests at high and low temperatures: An individual tube loaded with a pressure of 70 MPa was kept in a high temperature environment of for 15 min, transferred to a low temperature environment of −15° C. over 20 s and kept there for 15 min. A total number of 17 changes (9 for the high temperature and 8 for the low temperature) were carried out. The duration remaining in the high and low temperature was 15 min each, and the transferring time between the high and low temperature is 20 s. It was examined whether the individual tube was broken.

8. Test for tensile strength: universal material property testing machine with a precision regarding the value of force of ±0.5%. 3 finished sample plates of PMTS having a thickness of 30 mm, a length of 1000 mm and a width of 500 mm were examined.

9. Density measurement: electrical density meter.

10. Sintering analysis and temperature monitoring: automatic far infrared temperature meter.

11. Servohydraulic fatigue test: MTS servohydraulic fatigue test machine; test standards: vibration fatigue test method for engine blades and materials HB 5287-96 7; simulation for continuous durability and continuous service life.

12. Pressure limit measurement: 200 MPa Computer test bench, model SUPC_XT_200, SMJ Technology, Co., Ltd.

13. Measurement for gas filling speed: speed test at a water pressure of 0.1 Pa-70 MPa with a SUPC XT 200 test bench from SMJ Technology, Co., Ltd.: a high pressure set according to the sample pressure was outputted by a pressurizing pump; test pressure: 0-200 MPa; pressurized flow rate: 1.2 L/min; control precision of pressure: upper limit +2% and lower limit −1%; test medium: liquid water; pressure control: computer/manually; operation: computer/manually; structure: cycling system and pressure control system; workpiece: setting up the equipment, manual control; Note: Since there is no corresponding institute or standard for this test, the test method is design by the inventors. Steps for setting up and testing the apparatus:

(1) A gas filling valve of a gas cylinder (cylinder A) having a volume of 5 kg at MPa for test was installed and connected to a high pressure output connector of a pressurizing pump of the test bench, and the water inlet of the pressurizing pump was connected to a dedicated water source purified by filtering.

(2) The gas supply valve of a hydrogen storage module (cylinder B) having a PMTS-hydrogen storage volume of 2 kg was opened, the gas filling valve was connected sequentially to a high pressure flowmeter, a pressure gauge, a computer-controlled electromagnetic pressure valve, and then an electromagnetic port for gas supply of cylinder through chrome-molybdenum connecting pipes. The gas supply valve and the gas filling valve of cylinder A were opened. Then the gas supply valve of cylinder B is connected to a vacuum pump. After checking, the vacuum pump was started. The connected cylinders A and B were evacuated, and then the gas supply valves of cylinders A and B were closed.

(3) The output pressure value was set at the computer of the test bench: 70 MPa;

(4) The gas filling valve of cylinder A was opened.

(5) The test bench was started by the computer or manually.

(6) When the pressurized output to cylinder A by the test bench reached the set pressure value of 70 MPa, the pressure was maintained for 2 min. The electromagnetic valve for gas supply of cylinder A was opened to supply the pressure to cylinder B. The pressure in cylinder B reached 70 MPa after several seconds. The electromagnetic valve for gas filling of cylinder B was closed. The test was then concluded.

14. Intermittent and constant temperature control: intelligent high temperature regulation console.

15. Vacuum reaction kettle/vacuum pump/temperature/intelligent control: the pre-operation state of the vacuum reaction kettle lies at 35° C., and the operation state is at 40° C.-42° C. The vacuum needs to be kept constantly at −96 KPa to −101 KPa.

16. Tests for operation state/operation stability: Tenney (TJR-T2) environment test chamber/pressure gauge, for the operation state/operation stability of the PMTS material and hydrogen storage tube under a pressure of 70 MPa at a temperature of −18° C. to 65° C.

17. Test for Rockwell hardness: the test precision standard is in accordance with the standards GB/T230 and ISO6508; an indenter, a diamond cone with 120 degree angle, was pressed into the surface of the sample in two steps. After lifting the main test force, the residual depth of indentation, which represented the level of the hardness, was measured under an initial test force.

18. Ultra-low temperature test in liquid nitrogen: the PMTS precision structure was placed in liquid nitrogen and removed after 10 min.

Example 1

The PMTS material composition according to the present invention is prepared by the following processes in this example.

(1) Preparation of composition A: 17 parts by weight of analytically pure anhydrous aluminum chloride and 5 parts by weight of analytically pure magnesium chloride were placed in a transparent reaction kettle and mixed. 22 parts by weight of distilled water was added and stirred, to obtain a mixed solution of aluminum chloride and magnesium chloride at a concentration of 50 wt %. 1.2 parts by weight of analytically pure sodium hydroxide and 0.5 parts by weight of analytically pure potassium hydroxide were stepwise added. The reaction was allowed to process until it has been cooled down, yielding a while precipitate. The transparent liquid was extracted, and 3 parts by weight of analytically pure barium chloride was added to the white precipitate, stirred, left still standing for 30 min, dried at 100° C., processed at a high temperature of 870° C. for 90 min, cooled, and crushed to a mesh number of more than 8000 in a ball mill, so as to obtain the composition A for later use.

(2) Preparation of composition B: 12 parts by weight of nano aluminum oxide (type MG-Al032, purity 99.99%), 16 parts by weight of zirconium dioxide (type VK-R60, particle size 1-5 μm, purity 99.9%), 2.5 parts by weight of nano yttrium oxide (purity 99.99%), 8 parts by weight of nano titanium dioxide (type DT-O-007-2, rutile type, purity >99.9%) and 0.5 parts by weight of ultra fine hafnium oxide (type H301462, purity 99.99%) were mixed and stirred, so as to obtain composition B.

(3) Preparation of composition C: 24 parts by weight of PI (SP-1, DuPont, U.S.A.) was dissolved in dimethyl formamide, so as to obtain a PI solution at a concentration of 30 wt %, which was then added to a vacuum reaction kettle. The temperature in the kettle was kept at 40° C. under a vacuum of −94 KPa. Dimethyl formamide was added stepwise to adjust the viscosity to 90000 cP and stirred at a rotation speed of 10 r/min for 25 min. 33 parts by weight of nano silicon dioxide (purity 99.999%, 5 N grade) was then stepwise added and stirred for 15 min. All of the composition B prepared in step (2) was added and mixed for 20 min. 0.5 parts by weight of ultra fine lanthanum oxide (purity 99.99%) was then added and stirred for 15 min, so as to obtain composition C.

(4) Preparation of the PMTS material composition: 12 parts by weight of PVAc (industrial grade, purity 99.9%, characteristic viscosity 0.80 dL/g, from Jinan Pulaihua Chemical Co., Ltd., Shandong province, China) was diluted to a concentration of 75 wt % with distilled water and stirred for 10 min. All of the composition A prepared in step (1) was added and stirred for 20 min. The resultant mixture was added to the vacuum reaction kettle containing all of the composition C prepared in step (3). A proper amount of dimethyl formamide was injected, heated to 45° C., and stirred at a rotation speed of 10 r/min, so as to adjust the viscosity to 90000 cP and thus obtain a white bubble-free product, i. e. the PMTS material composition.

The PMTS material composition produced in the example is shelf-stable and can be used for manufacturing an individual tube having a high pressure hydrogen storage structure of the PMTS material. See example 2 for details.

Example 2

This example uses the PMTS material composition prepared in example 1 to prepare the individual tube having a high pressure hydrogen storage structure of the PMTS material according to the present invention through the following processes.

Step one: The PMTS material composition with a viscosity of 90000 cP prepared in example 1 was discharged into a U-shaped stainless steel flat bottom tank (1500 mm long, 500 mm wide, 200 mm high) and heated to 42° C., so as to adjust its viscosity to 200000 cP and thus obtain a concentrated PMTS solution. The amount of the concentrated PMTS solution added to the flat bottom tank was such that, after the addition of the polymer fibers, the level of the concentrated PMTS solution was finally 10 mm higher than the fully immersed fibers.

Step two: A fiber bundle was made beforehand of around 16800 polypropylene continuous fibers having a diameter of 150 μm and a length of 1340 mm. The two ends of the fiber bundle were secured with hanging clamps, and a length of 50 mm at each end of the fiber bundle remained out of the impregnation liquid. The fiber bundle was immersed into the concentrated PMTS solution obtained in step one, and then the two ends were pushed to the middle so that the fiber bundle became loose. This step was repeated several times, until the surfaces of the fibers were coated with the concentrated PMTS solution at a thickness of 25 μm-30 μm. The fiber bundle is removed from the liquid tank and cut into two equal halves while the ends are tightened. Then the ends are oriented vertically, so that the bundle is automatically adhered by means of a dripping process of the concentrated PMTS solution with balanced tension and gravity force. Before the curing of the adhered fibers for the bundle, they were placed into an inner tube, which has a cross section of regular hexagon, an outer diameter of 24.5 mm for the opposite parallel edges (the inner distance between opposite parallel edges plus the wall thickness), a wall thickness of 150 μm and a length of 620 mm. The inner tube was partitioned into two halves, which are filled fully with fibers for the bundle, flattened, and adhered to each other. The inner tube was inserted into a sleeve, which has a cross section of regular hexagon, an inner diameter of 25 mm for the opposite parallel edges (the inner distance between opposite parallel edges excluding the wall thickness), a wall thickness of 1.5 mm and a length of 620 mm. One end was sealed with a PMTS sealing solution having a viscosity of 1000000 cP (which was obtained through adjusting the viscosity of the PMTS material composition in example 1 by desolvation at 45° C.), sheathed with a plastic sealing film, kept hanging for curing in an enclosed environment at a constant temperature of 42° C. and a humidity of 10% for 240 min.

The tubular mold (including the inner tube and the sleeve) used in this example was made of a PMTS material, which was obtained by curing the PMTS material composition prepared in example 1 in an enclosed environment at 42° C. and a humidity of 10% for 240 min, curing at 50° C. for 60 min, sintering at 480° C. for 60 min (for a cured semi-finished product), sintering at 880° C. for 90 min (for a semi-finished product with a metallographical structure), and sintering at 1430° C. for 300 min.

Step three: The part of the fiber for the bundle, which has not been immersed, was trimmed and the immersed part was placed into a tunnel kiln, where the kiln temperature in each segment was preset for curing at 50° C. for 60 min, sintering at 480° C. for 60 min (for a cured semi-finished product), sintering at 880° C. for 90 min (for a semi-finished product with a metallographical structure), and finally sintering at 1430° C. for 300 min, so as to obtain an individual tube having a high pressure hydrogen storage structure of the PMTS material.

It was measured by a X-ray fluorescent spectrometer (ARL Perform'X 4200 XRF from Thermo Fisher) that, based on the total mass of the PMTS material, the PMTS material prepared in this example comprised the following components: 38.74 wt % of silicon dioxide, 19.71 wt % of aluminum oxide, 26.32 wt % of zirconium dioxide, 8.65 wt % of titanium dioxide, 0.46 wt % of hafnium oxide, 0.71 wt % of lanthanum oxide, 2.43 wt % of yttrium oxide, 0.12 wt % of potassium oxide, 0.84 wt % of sodium oxide, 0.36 wt % of magnesium oxide, 0.015 wt % of carbon, 1.61 wt % of barium oxide, 0.013 wt % of iron (III) oxide, 0.014 wt % of chrome oxide, and 0.008 wt % of impurities.

Figure 3:
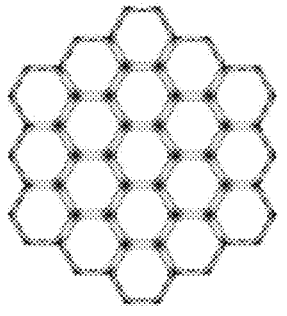
FIG. 3 is a schematic mechanical view of a honeycomb-like structural module composed of individual hexagonal hydrogen storage tubes from Embodiment 2.

The individual tube having a high pressure hydrogen storage structure of the PMTS material prepared in this example has a micrometer-scale microporous honeycomb-like structure, a length of the individual tube of 620 mm, a cross section of hexagon shape, an outer diameter for the opposite parallel edges of the sleeve of 28 mm and an inner diameter of 25 mm. The microscopic size of the wall thickness of the micropores lies between 35 μm and 40 μm, and the microscopic diameter of the micropores lies between 140 μm and 150 μm. An individual tube comprises around 16800 micrometer-scale single pore tubes, each having a hydrogen storage volume of about 10.6 mm³. Therefore, an individual tube having a microporous honeycomb-like structure has a hydrogen storage volume of about 178080 mm³, i. e. 0.000178 m³. The individual tube having a high pressure hydrogen storage structure of the PMTS material is applicable in complex dynamic conditions and can realize hydrogen storage with high safety and high stability. The size of the individual tube having a high pressure hydrogen storage structure of the PMTS material is reduced by 50% in comparison to a carbon fiber container with a hollow inner tank having the same volume at 70 MPa. The desired hydrogen storage volume or scale may be achieved by parallel connecting N individual tubes into a tube bundle and combining N tube bundles into a module and/or N modules. A schematic mechanical view of a honeycomb-like structural module composed of individual tubes from this example is shown in FIG. 3.

Test Example 1: Property Tests for the Individual
Tube Having a High Pressure Hydrogen Storage
Structure of the PMTS Material Charpy impact tests at high and low temperatures were conducted on the individual tube prepared in example 2. The results show that there was no burst or leakage in the individual tube, which means that the individual tube according to the present invention met the requirements for hydrogen storage at 70 MPa.

A servohydraulic fatigue test was conducted on the individual tube prepared in example 2. The results show that the individual tube has a continuous service life of >20000 hours measured in simulation, which indicates a very long service life of the individual tube.

The limit pressure of the individual tube prepared in example 2 was measured on a 200 MPa test bench. The results show that the individual tube can withstand a pressure exceeding the detection limit (the detection limit being 200 MPa) and indicates a very high limit pressure of the individual tube of the present invention. The safety pressure for hydrogen storage is set according to the limit pressure: safety pressure for hydrogen storage=limit pressure for hydrogen storage/safety factor (generally being 2). In special applications, a larger safety factor and thus a lower safety pressure for hydrogen storage are required. The micrometer-scale microporous honeycomb-like hydrogen storage structure according to the present invention effectively inhibits the pressure rising of high pressure hydrogen activation energy in any condition, and thus the micrometer-scale microporous honeycomb-like hydrogen storage structure according to the present invention can exhibit very high safety and high stability with a safety factor of 2 in any complex environment.

A gas filling speed test was conducted on the individual tube prepared in example 2. The results show that the simulated gas filling speed at 70 MPa is 2 kg/3 s, indicating a high gas filling speed of the hydrogen storage structure according to the present invention. This means that the PMTS material and the microporous honeycomb-like hydrogen storage structure eliminate the influence of turbulence, which is produced by high gas filling speed in a hydrogen storage structure having a hollow inner tank, on the gas filling rate. Currently, the qualified criterion of gas filling rate for a hydrogen storage container having a hollow inner tank at 70 MPa is kg/3 min domestically and abroad.

An ultra-low temperature test in liquid nitrogen was conducted on the individual tube prepared in example 2. The results show that there was no breaking or deformation in the individual tube after it was placed in the liquid nitrogen for 10 min, which means that the individual tube has excellent low temperature resistance.

Tests for operation state/operation stability were conducted on the individual tube prepared in example 2. The results show that the individual tube has a pressure variation in the range of ±5% at 70 MPa after being kept at a low temperature (−18° C.) and a high temperature (65° C.) for 15 min each, which indicates good operation stability of the individual tube.

Test Example 2: Property Tests for PMTS Material

The PMTS material composition from example 1 was casted into a thin plate, cured in an enclosed environment at 42° C. and a humidity of 10% for 240 min, cured at 50° C. for 60 min, sintered at 480° C. for 60 min (for a cured semi-finished product), sintered at 880° C. for 90 min (for a semi-finished product with a metallographical structure), and sintered at 1430° C. for 300 min to obtain the PMTS sample plates having a thickness of 5 mm and 30 mm.

The PMTS sample plate having a thickness of 5 mm prepared from the PMTS material composition from example 1 has a specific weight of 5.2 g/cm³ and a Rockwell hardness of 87, indicating a very high hardness of the PMTS material according to the present invention.

Tests for resistance to acid and base were conducted on the PMTS sample plate having a thickness of 5 mm. The results show that there was no corrosive damage on the PMTS sample plate at pH=3 and pH=14 (according to the test standards of ASTM E407-07 (Reapproved 2015) e17.1-7.15). The Rockwell hardness measurement was conducted on the PMTS sample plate which had been subjected to the tests for resistance to acid and base at pH 3 and pH 14. The results show that it has a Rockwell hardness of 87, indicating an excellent resistance to acid and base of the PMTS material according to the present invention.

A test for resistance to high temperature was conducted on the PMTS sample plate having a thickness of 5 mm. The test simulated a temperature of 60° C., which corresponded to the temperature in a vehicle under insolation in summer. The results show that the PMTS sample plate prepared from the PMTS material composition from example 1 has a thermal conductivity coefficient of 2.67 W/(m·K), indicating an excellent resistance to high temperature of the PMTS material according to the present invention.

A test for tensile strength was conducted on the PMTS sample plate having a thickness of 30 mm. The results show that the PMTS sample plate prepared from the PMTS material composition from example 1 has a tensile strength of >3000 MPa, indicating a very high tensile strength of the PMTS material according to the present invention.

The invention claimed is:

1. A material for a hydrogen storage structure, wherein based on the total mass of the material for a hydrogen storage structure, the material for a hydrogen storage comprises the following components: 33-39 wt % of silicon dioxide and/or beryllium oxide, 17-22 wt % of aluminum oxide, 20-28 wt % of zirconium dioxide, 6-10 wt % of titanium dioxide, 0.25-0.5 wt % of hafnium oxide, 0.45-0.9 wt % of lanthanum oxide, cerium oxide and/or lanthanum cerium oxide, 1-2.7 wt % of yttrium oxide, 0.12-1 wt % of potassium oxide and/or sodium oxide, 0.18-0.4 wt % of magnesium oxide, 1-1.7 wt % of barium oxide, 0-10 wt % of zinc oxide, and unavoidable impurities.

2. A composite material for a hydrogen storage structure, wherein the composite material comprises the material for a hydrogen storage structure according to claim 1 and a reinforcement filler.

3. A method for preparing the material for a hydrogen storage structure according to claim 1, wherein the method comprises:

curing a material composition for a hydrogen storage structure at 40-45° C. for 200-250 min, heating at 50-60° C. for 50-70 min, heating at 360-480° C. for 50-70 min, sintering at 850-900° C. for 80-100 min, and then sintering at 1400-1450° C. for 250-350 min or sintering at 3000° C.±100° C.;

wherein raw materials for the material composition for a hydrogen storage structure comprise the following components:

20-24 parts by weight of polyimide, 12-13 parts by weight of polyvinyl acetate, 15-17 parts by weight of aluminum chloride, 3-5 parts by weight of magnesium chloride, 3-5 parts by weight of barium chloride, 10-12 parts by weight of aluminum oxide, 15-17 parts by weight of zirconium dioxide, 0.5-0.7 parts by weight of lanthanum oxide, cerium oxide and/or lanthanum cerium oxide, 32-35 parts by weight of silicon dioxide, silicon carbide and/or beryllium oxide, 1.5-2.5 parts by weight of sodium hydroxide and/or potassium hydroxide, 1.5-3 parts by weight of yttrium oxide, 6-8 parts by weight of titanium dioxide and/or titanium carbide, and 0.3-0.5 parts by weight of hafnium dioxide and/or hafnium carbide.

4. An individual hydrogen storage tube, the individual hydrogen storage tube comprising a hydrogen storage unit, wherein the hydrogen storage unit comprises the material for a hydrogen storage structure according to claim 1 and has a honeycomb-like microporous structure.

5. The individual hydrogen storage tube according to claim 4, wherein the individual hydrogen storage tube further comprises a housing comprising the material for a hydrogen storage structure or a composite material for a hydrogen storage structure;

wherein the composite material for a hydrogen storage structure comprises the material for a hydrogen storage structure and a reinforcement filler.

6. A method for preparing the individual hydrogen storage tube according to claim 4, wherein the method comprises the following steps:

(1) impregnating a polymer fiber bundle with a material composition for a hydrogen storage structure; and (2) curing the polymer fiber bundle impregnated with the material composition for a hydrogen storage structure at 40-45° C. for 200-250 min, heating at 50-60° C. for 50-70 min, heating at 360-480° C. for 50-70 min, sintering at 850-900° C. for 80-100 min, and then sintering at 1400-1450° C. for 250-350 min or sintering at 3000° C.±100° C.; or alternatively, filling the polymer fiber bundle impregnated with the material composition for a hydrogen storage structure into a tubular mold made by a material for a hydrogen storage structure or a composite material for a hydrogen storage structure, curing at 40-45° C. for 200-250 min, heating at 50-60° C. for 50-70 min, heating at 360-480° C. for 50-70 min, sintering at 850-900° C. for 80-100 min, and then sintering at 1400-1450° C. for 250-350 min or sintering at 3000° C.±100° C.;

wherein raw materials for the material composition for a hydrogen storage structure comprise the following components:

20-24 parts by weight of polyimide, 12-13 parts by weight of polyvinyl acetate, 15-17 parts by weight of aluminum chloride, 3-5 parts by weight of magnesium chloride, 3-5 parts by weight of barium chloride, 10-12 parts by weight of aluminum oxide, 15-17 parts by weight of zirconium dioxide, 0.5-0.7 parts by weight of lanthanum oxide, cerium oxide and/or lanthanum cerium oxide, 32-35 parts by weight of silicon dioxide, silicon carbide and/or beryllium oxide, 1.5-2.5 parts by weight of sodium hydroxide and/or potassium hydroxide, 1.5-3 parts by weight of yttrium oxide, 6-8 parts by weight of titanium dioxide and/or titanium carbide, 0.3-0.5 parts by weight of hafnium dioxide and/or hafnium carbide;

and wherein the composite material for a hydrogen storage structure comprises the material for a hydrogen storage structure and a reinforcement filler.

7. A method for preparing the composite material for a hydrogen storage structure of claim 2, wherein the method comprises: curing a mixture of a material composition for a hydrogen storage structure and a reinforcement filler at 40-45° C. for 200-250 min, heating at 50-60° C. for 50-70 min, heating at 360-480° C. for 50-70 min, sintering at 850-900° C. for 80-100 min, and then sintering at 1400-1450° C. for 250-350 min or sintering at 3000° C.±100° C.;

wherein raw materials for the material composition for a hydrogen storage structure comprise the following components:

20-24 parts by weight of polyimide, 12-13 parts by weight of polyvinyl acetate, 15-17 parts by weight of aluminum chloride, 3-5 parts by weight of magnesium chloride, 3-5 parts by weight of barium chloride, 10-12 parts by weight of aluminum oxide, 15-17 parts by weight of zirconium dioxide, 0.5-0.7 parts by weight of lanthanum oxide, cerium oxide and/or lanthanum cerium oxide, 32-35 parts by weight of silicon dioxide, silicon carbide and/or beryllium oxide, 1.5-2.5 parts by weight of sodium hydroxide and/or potassium hydroxide, 1.5-3 parts by weight of yttrium oxide, 6-8 parts by weight of titanium dioxide and/or titanium carbide, and 0.3-0.5 parts by weight of hafnium dioxide and/or hafnium carbide.

8. The individual hydrogen storage tube of claim 4, wherein a micropore of the honeycomb-like microporous structure has a wall thickness of 35-40 μm.

9. The individual hydrogen storage tube of claim 4, wherein a micropore of the honeycomb-like microporous structure has a diameter of 140-150 μm.

10. The method of claim 6, wherein a viscosity of the material composition for a hydrogen storage structure is adjusted to 200000±10000 cP before the impregnation in step (1).

11. The method of claim 6, wherein the polymer fiber has a melting point between 150° C. and 380° C.

12. The method of claim 6, wherein a single fiber in the polymer fiber bundle has a diameter of 100-150 μm.

13. The method of claim 6, wherein an average thickness of the material composition for a hydrogen storage structure coated on the surfaces of the fibers in the polymer fiber bundle by impregnation in step (1) is 25-30 μm.

14. The material for a hydrogen storage structure of claim 1, further comprising 0.07-0.7 wt % of calcium oxide.

* * * * *